(12) United States Patent
Jacoby

(10) Patent No.: US 9,843,833 B2
(45) Date of Patent: *Dec. 12, 2017

(54) METHODS AND SYSTEMS FOR APPLICATION RENDERING AND MANAGEMENT ON INTERNET TELEVISION ENABLED DISPLAYS

(71) Applicant: Yahoo! Inc., Sunnyvale, CA (US)

(72) Inventor: Ronald Jacoby, Saratoga, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,857

(22) Filed: Oct. 17, 2016

(65) Prior Publication Data

US 2017/0155949 A1    Jun. 1, 2017

Related U.S. Application Data

(63) Continuation of application No. 14/226,744, filed on Mar. 26, 2014, now Pat. No. 9,491,502, which is a continuation of application No. 13/075,149, filed on Mar. 29, 2011, now Pat. No. 8,726,305.

(60) Provisional application No. 61/320,685, filed on Apr. 2, 2010.

(51) Int. Cl.
| | |
|---|---|
| *H04N 21/235* | (2011.01) |
| *H04N 21/435* | (2011.01) |
| *H04N 21/431* | (2011.01) |
| *H04N 21/61* | (2011.01) |
| *H04N 21/81* | (2011.01) |

(52) U.S. Cl.
CPC ....... *H04N 21/4351* (2013.01); *H04N 21/431* (2013.01); *H04N 21/4316* (2013.01); *H04N 21/6125* (2013.01); *H04N 21/6175* (2013.01); *H04N 21/812* (2013.01); *H04N 21/8166* (2013.01)

(58) Field of Classification Search
CPC ........... H04N 21/2353; H04N 21/2542; H04N 21/25825; H04N 21/25833; H04N 21/26291; H04N 21/278; H04N 21/431; H04N 21/4351
USPC ............................................. 725/60, 86, 110
See application file for complete search history.

(56) References Cited

U.S. PATENT DOCUMENTS

| | | | | |
|---|---|---|---|---|
| 2003/0142039 | A1* | 7/2003 | Minear | G06Q 30/02 345/2.3 |
| 2008/0281974 | A1* | 11/2008 | Slothouber | G06F 17/30867 709/229 |

* cited by examiner

*Primary Examiner* — Dominic D Saltarelli
(74) *Attorney, Agent, or Firm* — Martine Penilla Group, LLP

(57) ABSTRACT

Methods and systems are provided for enabling presentation of supplemental application content to display devices while particular content is rendered on the display device. One example method includes receiving a request, at a server, to register a display device. The display device has hardware for communication over the Internet with the server. The display device further includes hardware for communication with a broadcast television provider that provides broadcast content to the display device. The method also includes registering the display device with the server. The registering includes receiving attributes of the display device. Also included is receiving information, at the server, regarding content rendered on the display device, and sending to the display device application data for at least one of the applications of the display device. The application data is correlated to the content rendered on the display device.

18 Claims, 16 Drawing Sheets

METHODS AND SYSTEMS FOR APPLICATION RENDERING AND MANAGEMENT ON INTERNET TELEVISION ENABLED DISPLAYS

CLAIM OF PRIORITY

This application is a continuation of U.S. patent application Ser. No. 14/226,744, filed on Mar. 26, 2014, entitled "Methods and Systems for Application Rendering and Management on Internet Television Enabled Displays," which is a continuation of U.S. patent application Ser. No. 13/075,149, filed on Mar. 29, 2011, entitled "Methods and Systems for Application Rendering and Management on Internet Television Enabled Displays", which claims priority from U.S. Provisional Application No. 61/320,685, filed on Apr. 2, 2010, entitled "Methods and Systems for Display Device Widget Access and Management," the disclosures of which are herein incorporated by reference.

CROSS REFERENCE TO RELATED APPLICATIONS

This application is related to U.S. application Ser. No. 12/894,569, filed on Sep. 30, 2010, entitled "System and Method for Controlling a Networked Display," and U.S. application Ser. No. 12/977,643, filed on Dec. 23, 2010, and entitled "Signal-Driven Interactive Television," each of which is herein incorporated by reference.

BACKGROUND

The present invention relates to interactive applications, and more specifically, to applications that can be run on a display device, such as a television. Current technology includes systems that enable devices, such as television systems to become a display for a computer. The computer can be a standard personal computer, a laptop, a set-top box, video player box, etc. The common theme has been, to provide a box that connects to the television system to enable users to access content installed on the box or download content over the internet. The problem with these system is that the box manufacturers all have different systems, protocols and software that must be learned, managed, loaded and updated.

This is a complexity that, even if learned, becomes obsolete when new versions come out or the box manufacturer stops supporting the device. Further yet, must users are not comfortable programming set-top boxes or even video machines, let alone installing programs and managing the installation. Even if particular users are comfortable with the technology, the fact that internet access is required to communicate with services adds even more complexity. Some systems require the user to enter codes, set-up routines, or even program settings to enable communication with routers, hubs, IP addresses, etc. This is simply too complicated for the mass public that simply desires to view a television by pushing a few buttons to navigate, e.g., like a standard remote control.

It is in this context that embodiments of the invention arise.

SUMMARY

Embodiments are described with reference to methods and systems for providing access to, installing, administering and rendering web-based applications (e.g., widgets) on a display device, which connect to server(s). All references to the term "widget" should be broadly construed to define an application, part of an application, metadata describing an application or function, an online application, part of an online application with server/client construction or co-processing (i.e., sharing of processing), or combinations thereof, which can provide the noted functional operations. In some cases, instead of calling the application a "widget," a common alternative naming convention can include "APP," which is short for "application."

The embodiments define methods for enabling a user to easily access applications from a television, using basic navigate and select functions, similar to a remote control. Alternative navigation tools can include, for example, a smart phone executing an application, which is interfaced with the display (i.e., using a wireless connection), a tablet computer (e.g., an iPad from Apple Computer or similar device, an android driven device, etc.), a laptop with wireless functionality or any connected device with memory and some processing power. FIG. 11 shows an example where either a smart phone or a remote can be used to interface with the display and the apps/widgets rendered thereon. Additionally, other devices, such as tablet computers, laptops, or other devices capable of rendering a user interface (i.e., GUI), can be used for interfacing wirelessly with the display device and applications executing thereon. The system software and applications (widgets), in one embodiment, are configured to automatically interface with services over the Internet to provide access to those widgets that are predetermined to be allowed for use on a particular requesting television system. The system hardware and software on the television system will therefore automatically interface and communicate with services, and will be granted authorized access to selected widgets and services, depending on predefined filtering attributes of the display device, the developer of the widgets, television manufacturers, etc. If the filtering enables such access, the widgets are made available automatically to the user of the television system.

In one embodiment, each of the widget applications include filtering parameters associated therewith, such that sharing of the widget applications enables the examining before authorizing access to the requesting display device.

The servers are defined by a system infrastructure of software, hardware and storage, that can be distributed, load-balanced and accessed over the internet from any connected location on the globe. With these broad definitions in mind, it will be appreciated that the various embodiments can be defined as systems, methods, apparatus, computer readable media, and computer driven code.

In one embodiment, a computer implemented method for managing communication between a display device and a remote server is provided. The remote server provides access to widget applications that are to be used on the display device. The method includes receiving a request from the display device, and the request includes data that identifies attributes of the display device. Then, examining the data to authorize access a specific application widget gallery. The specific widget gallery includes widget applications that have passing filter parameters for the request. Then, returning to the display device data for populating attributes or widget application data for rendering on the display device.

In another embodiment, the request is generated at the display device, and the examining is executed at the remote server. The server can then return data, based on processing performed by the remote server.

In another embodiment, the methods and systems for providing access to, installing, administering and rendering web-based applications (e.g., widgets) on a display device, which connects to a server, are provided. The server is defined by a system infrastructure of software, hardware and storage that can be distributed, load-balanced and securely accessed over the internet from any connected location on the globe. A display device, as used herein, is generally a system, with integrated hardware and software that will enable access to the internet, browsing and connections to remote processing servers and storage. The display device, in one example, is a television set, with integrated hardware, memory and software, which can connect to the Internet. In other embodiments, the software and hardware is integrated into a separate box that connects to the television display.

In still another embodiment, a system for rendering internet applications on a television system is provided. The system can include a television system with an integrated processor and memory for rendering the internet applications as well as broadcast data. In other embodiments, a module box containing the widget processing applications can be interfaced between the broadcast data provider (cable, satellite, etc.), the internet service provider (i.e., ISP), and the display screen. In one embodiment, the system can include a client program configured for execution on the processor and memory of the television system. A server system configured to store and provide applications is coupled to the client over the internet. Each application is configured with filters, and the filters are used upon exchanges between the client program and the server system. The filters act to include or exclude applications available to the client program based on identification data associated with the television system. The filtering is processed between the client program and the server automatically without user interaction to enable rendering of applications with passing filters on the television system. The applications with passing filters can be illustrated as active on an application dock, and capable of being rendered on a screen area of the television system.

In one embodiment, the server system is provided with load balancing systems and are connected to cloud storage. The cloud storage enables access to the client program of the television system and additional client programs executing on additional television systems simultaneously. In one example, filtering is continuously executed by the server system for each client program requesting access to the server system to access applications. The applications can be created and maintained by multiple third parties, and each third party defines specific filters for their applications.

BRIEF DESCRIPTION OF DRAWINGS

The invention may best be understood by reference to the following description taken in conjunction with the accompanying drawings.

DETAILED DESCRIPTION

Figure 1:
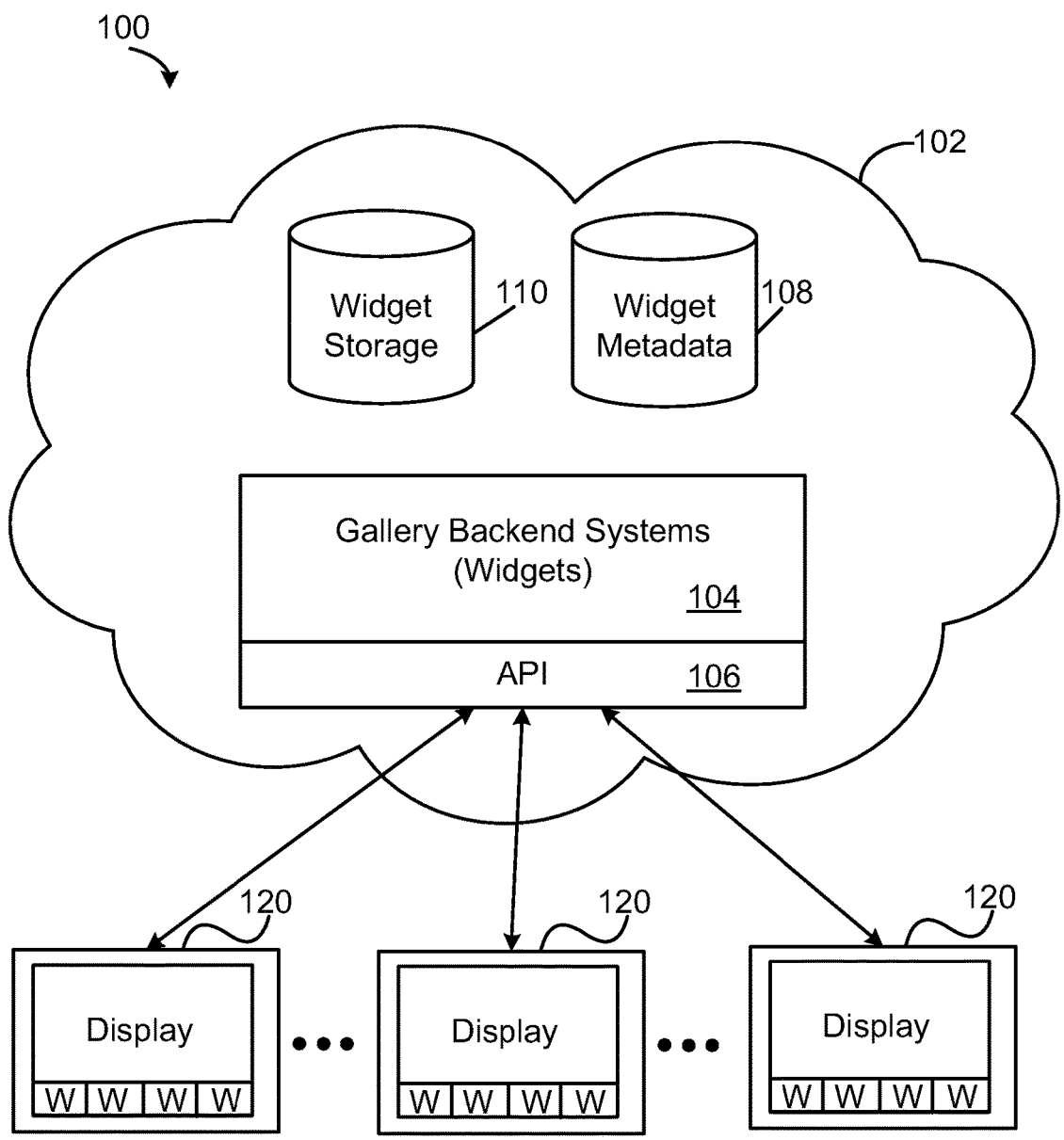
FIG. 1 illustrates a high-level diagram of the system infrastructure for interfacing display devices to a gallery back end system, in accordance with one embodiment of the present invention.

Embodiments are described with reference to methods and systems for providing access to, installing, administering and rendering web-based applications (e.g., widgets) on a display device, which connects to a server. Broadly speaking, the server is defined by a system infrastructure of software, hardware and storage that can be distributed, load balanced and accessed over the internet from any connected location on the globe. A display device, as used herein, is generally a system, with integrated hardware and software that will enable access to the internet, browsing and connections to remote processing servers and storage. The system can be a television set, a computer display, or any screen that has integrated hardware/software for interfacing with the internet. In other embodiments, a computing box can be connected to an existing system to enable the functionally provided by display devices that may or may not have integrated hardware and software.

In specific embodiments, users of various display devices are able to start up their display device and immediately access widgets that are preinstalled in memory of the display device, or can navigate to access more widgets that may be available for the specific display device. In the various embodiments, discussion will be provided as to how matching occurs between widgets managed by a widget gallery infrastructure and the display devices that want access to widgets. Filtering methods are provided to enable matching of widgets to specific display devices.

System Overview: Part I

Embodiments will be described regarding the services provided by the Widgets Gallery Service. This service consists of interfaces designed for use by the Widget Gallery Widget, the dock Widget Update mechanism, the Widget Publisher web site, the OEM Gallery web site, the Yahoo! Gallery web site, the Gallery Admin web site, and the OEM Gallery API. As much as feasible, these APIs utilize the same service definitions and use access permissions to control the available operations which may be allowed. Although reference is made to systems and infrastructure created and engineered by Yahoo! Inc. and partners, the disclosed functionally can be rendered using infrastructure created by any company, individual or groups. With this in mind, any reference to the term "widget" should be broadly construed to define an application, part of an application, metadata describing an application or function, an online application, part of an online application with server/client construction or co-processing, or combinations thereof, which can provide the noted functional operations. In some cases, instead of calling the application a "widget," common alternative naming conventions include calling such application an "APP." Thus, whether it's called an App or a widget, the aspects of functional processing, handling, management and interfacing with system or server applications will be described herein.

Accordingly, a TV Widget Gallery data model consists of a top level entity called a widget. A widget represents a single downloadable software item. Widgets are identified with an unique id. Widgets also contain another identifier which is their wid. A "wid" is the unique identifier employed to uniquely name a widget. While the id will be unique for every version of a TV Widget, the wid will remain the same across every version of the widget. Therefore, all widgets in the gallery with the same wid represent different versions of the same TV Widget. A version field is used to identify individual widget versions. Versions can be in a multipart dotted integer format, such as 1.2.3. One example format is the 3 part version just mentioned, although other formats work as well.

A Widget in the TV Gallery can represent different types of downloadable items. A type field is used to distinguish these items. Among the different types of widget items are user widgets, systems widgets, and components of the TV Widget client itself, such as the Container and Framework. Multiple language fields for title, description, pubname, and pubcompany are available to represent user-friendly information about the widget. A tags and rating field are used to capture user feedback on a widget.

Widgets are created by authors. Multiple author items can be created for each widget. Author information may include name and company fields. Widgets can be placed into categories. Each widget contains a list of categories to which it belongs. Each category item contains an id of the category, a language-dependent category name, and an order field. The order field is used to affect the ordering that a widget obtains within that category. In most categories, the lower the order value the earlier in the list a widget will appear.

In one embodiment, each widget can contain multiple files. Files are identified by an id. A file has a size and mimetype fields to help the application understand how that file might be used. A hash field is also present, which may be the MD5 digest computed over the file. It can be used to validate the download from the Widget Gallery. The TV Widget Gallery data model does not enforce meaning around the individual files that a widget contains, but semantics of use around files can be enforced by the higher level services. In one embodiment, these services will create icon, image, and widget files for every user widget or system created. The icon and image files are used by the Widget Gallery Widget for display on the TV. The widget file represents the widget code package itself. Services can obtain the contents of a file from the URL provided in the link field.

In one embodiment, for a widget to appear within the Widget Gallery Widget on a TV, the widget must be approved. Approvals provide a list of acknowledgments that widget is able to be displayed within a gallery. Each approval has role, status, reason and state fields. The role identifies who is represented by the approval. The status indicates the current state of the approval. The reason field defines the reason a certain approval action was taken, which is mostly used if a widget is rejected. The state field represents the cumulative state the widget, taking into account the approval status of the relevant roles of author, Yahoo! (or other entity), and the manufacturer. Each approval also may contain a list of testers. A tester identifies a Yahoo! User ID that is able to preview a widget prior to its approval. Testers are limited to previewing widgets only a device identified by code. Each tester item includes devcodes, and a list of the developer codes for the devices on which the tester may preview the widget.

Approvals may also contain a list of filters. Filters provide a means to restrict the approval of a widget. In one embodiment, each filter consists of a field, an operator, and values. The field defines the data item that is used in the filter. An operator defines the operation to be performed over the data item. The values define a list of data for the operator to compare with the field.

As will be described below, the Widget Gallery provides filters to be set on widgets in the gallery. Filters are expressions that must be matched for the widget to show up in the Widget Gallery widget on the TV. The Partner Service provides the mechanism to attach OEM specific filters to widgets, which are approved into the OEMs gallery view. The filters are simple expressions with the operators of exists, notexists, equal, and notequal, for example: brand equal "BMW."

A particular filter can have multiple values. If one of these values is matched, the whole filter is considered a match, for example model equal "325ci, 540i" would return true for either 325ci or 540i.

Filters can be set by the author, Yahoo!, the OEM, etc. For a widget to be displayed, all filters must pass. This allows an author, for example, to restrict their widget by country due to rights restrictions. If the author specifies region US, neither Yahoo! nor an OEM could override the author and make a match by adding region DE. This will simply create a conflict and the widget could never be displayed.

Many different service interfaces are defined by the TV Widget Gallery Service. Different services will provide different visibility or views into the data model. For instance, a Publisher may be able to view their name, company, email, and Yahoo! ID, included in the author field of a widget, while a Partner may only be able to view the name and company.

System/Method Embodiments: Part II

FIG. 1 illustrates a block diagram of a system 100 that includes widget gallery infrastructure 102 along access to a plurality of display devices 120. The widget gallery infrastructure 102 includes gallery back end systems 104 for managing widgets that are used by the display devices 120 to enable access through a display device 120 to internet applications. Display device 120 is shown with a plurality of widgets ("W") that can be accessed through a normal interface of a display device 120.

By accessing the widgets on the display device, a user can access certain applications or services provided by various developers. The services may include movie services, weather services, search services, and any other interactive application as defined by the widget installed in the display device 120. The display device, in one embodiment, is a television or apparatus with display capabilities. Televisions that include circuitry and memory, for storing various widgets that can be downloaded from the widget gallery infrastructure 102, enable user access through the display device 120, to the various applications. By integrating circuitry and memory in display device 120, users of the display device 120 need not connect a separate box for access to the internet to accessing applications.

The integrated circuitry in memory of display device 120 is configured to interface with an API 106 of the widget gallery infrastructure 102 to provide access to the gallery back end systems 104. Display devices 120 can be from various manufacturers, and depending on the manufacturer, authenticated access from specific display devices 120 to the API 106 is provided. When users of specific authorized display devices access API 106, the API 106 will provide access to the gallery back end systems 104. Gallery back end systems 104 have access to widget metadata 108 that defines the attributes and characteristics of the various widgets available from the widget gallery infrastructure 102.

The widget metadata 108 provides data information (about widgets) and pointers to the various widget storage locations 110. Widget storage 110 is a database that is distributed, such as storage in cloud infrastructures. Cloud infrastructures enable storage to be connected to the internet and placed in various locations for access from any location throughout the globe, depending on access requirements. Accordingly, the various display devices 120, depending on the widgets installed therein or obtained from the widget gallery infrastructure 102, can access various applications (widgets) to provide interactive use on display device 120.

The widgets available for installation in the display devices 120, or preinstalled in display devices 120 at the time of purchase, would be specific to the various display devices and manufacturer. For example, certain manufacturers will have partnerships with different service providers or application providers that enable only certain display devices 120 to access certain widgets. By maintaining access through the API 106 to the gallery back end systems 104, the widget gallery infrastructure 102 can ensure that the proper widgets for each specific display device 120 is made available, and different manufacturers can gain access to the various widget data based on the needs of the users.

Figure 2:
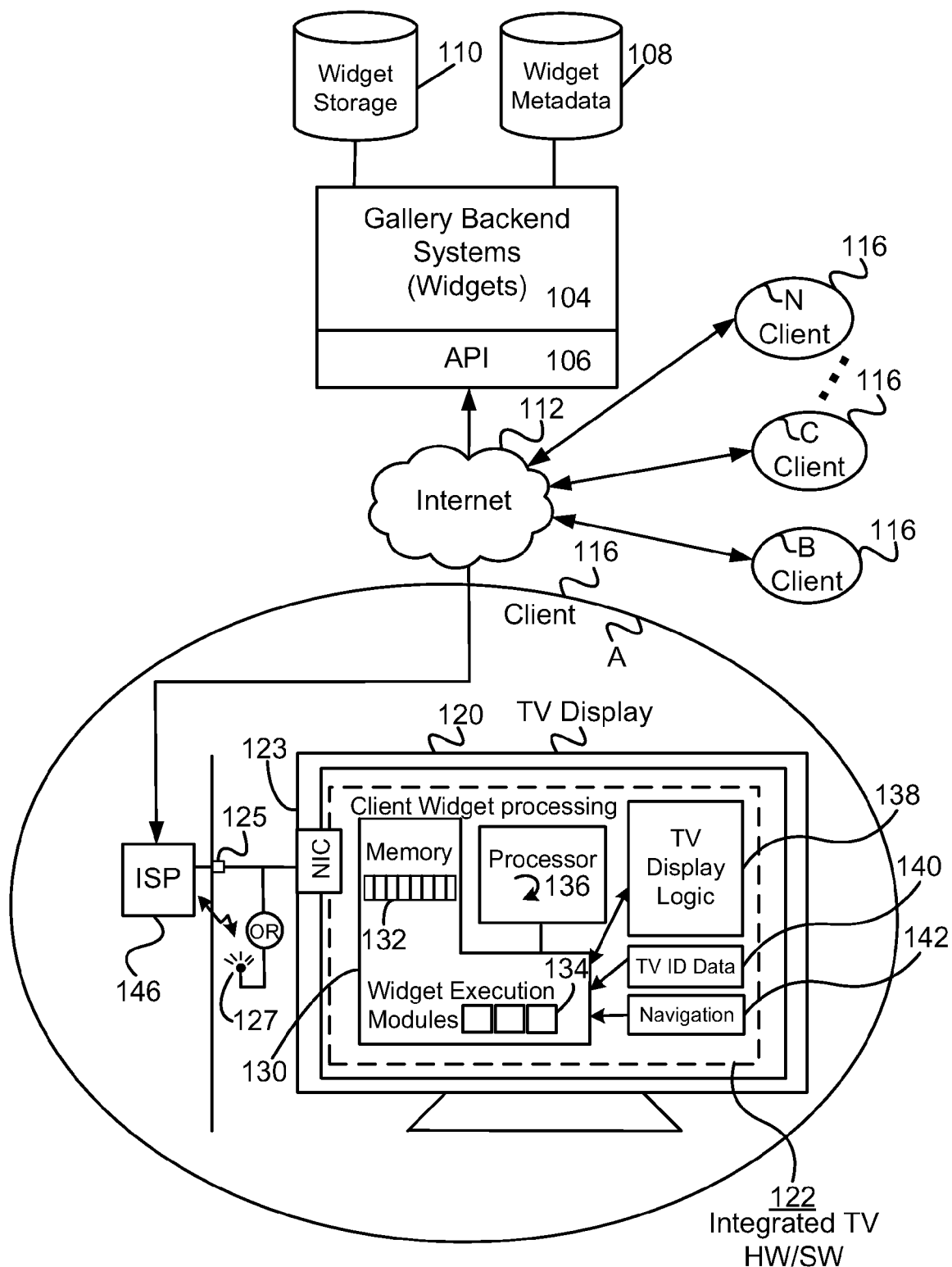
FIG. 2 illustrates a more detailed diagram of a display device connecting to the internet to access the gallery back end systems, and hardware and software associated with a display device, in accordance with one embodiment of the present invention.

FIG. 2 illustrates a more detailed diagram of a display device 120 connecting to the API 106 of the gallery back end systems 104. As shown, display device 120 accesses the gallery back end systems through the internet 112. At the same time, various clients B, C, . . . N 116 can also access the gallery back end systems 104 through the internet 112. Client 116 identified as capital "A", shows display device 120 with various components, such as integrated TV hardware and software 122. The client widget processing of the integrated TV hardware and software 122 may include memory 130, and various logic components, such as TV display logic 138, TV ID data 140, navigation 142, and a processor 136.

The processor 136 can be a dedicated processor, a programmable processor, a digital signal processor, or any other processing circuitry that can enable operation at the client widget processing 122 of display device 120. The client widget processing is shown connected to a NIC (network interface card) 123, that provides display device 120 access to the internet through a connected plug 125, or through a wireless connection 127. The internet connection is provided through the user's internet service provider 146 that then provides access to the internet 112. When accessing internet 112, requests and data transactions between display device 120 and the gallery back end systems 104 are provided through API 106.

As noted above, API 106 allows display devices 120 access to specific widgets within the gallery back end systems 104. Those specific widgets are identified using filters (as will be described below) that enable the gallery back end systems to either provide access or deny access to specific requests from the various display devices 120. Also integrated in the client widget processing of the TV hardware and software, is memory 132 that can act as a widget buffer for storing various widgets or components of widgets that are stored on display device 120. Additionally, widget execution modules 134 may also be installed in memory of the client widget processing 122 to provide the functionality of display device 120 to access, interface with, and update various widgets from gallery back end systems 104.

For example, display device 120 may come with preinstalled widgets that are stored in memory 132, and upon first use of display device 120, the client widget processing will connect to the internet and access the gallery back end systems 104 to register and determine if the widgets that were preinstalled on display device 120 are current, and if updates are required. Additionally, users of display device 120 may require access to new widgets or request that new widgets be installed on display device 120 (e.g., by searching menus of available widgets).

As more widgets are installed on display device 120, the widget buffer 132 will grow in size to accommodate the various widgets. Older widgets that are no longer used by display device 120 may be deleted, or less used widgets may be un-installed to make room for new widgets. In operation, display device 120 will operate in normal TV mode using the TV display logic 138, and from time to time, when users desire to access widgets installed on the display device 120, users may select a button on a remote control or other interface device to trigger activation of the widget gallery application that displays a number of widgets near a bottom region of the display device. Displaying the widgets in a bottom region of display device, described herein as a widget dock, enables users to select specific widgets with simple left-right command and select, normally found on television remote devices. When the user does not desire to view widgets, the widget dock will disappear from the bottom region of the display device to maximize the display region of display device 120. In one embodiment, the widget dock can be placed in any location on the screen, depending on user preferences. In one embodiment the widget application data rendered on the display device is contained in a widget dock, and the widget dock is as a graphical user interface on the display device. For example, the widget dock can render or contain each widget application and provided functionality as an interface icon. Once the user select the interface icon on the widget application, the user is provided with the associated content on the display, is linked to the content or is provided with further options that are selectable through menus, lists, selections, other icons, other links, etc.

Still further, in one embodiment, each interface icon in the widget dock is selectable through one or more of a remote device, a smart phone, a pointer, a gesture, and further interfacing, logic, selections, and processing provided for both interfacing with television broadcasting and the widget applications, provided in the widget dock or in another location on the screen. For instance, in one embodiment, the widget application can be an icon that is rendered on the screen, without widget dock. In one embodiment, the internet data provided by the widget application is coordinated with specific content being displayed in a broadcast presented on the display device. For instance, if the user is viewing a specific sporting event, details about the players can be presented automatically along one side, or on a screen that is transparently laid over broadcast content.

The content can also be supplemental data provided by third parties, such as news organizations, data regarding advertising, or deal of the day or group related deals. Still further, a particular widget application can monitor data selected for presentation on the display device, where the monitoring enables presentation of relevant advertising content, social media interaction, and comment exchanges between multiple connected parties, etc. The interface between the user's selected broadcasted data and the widget application can therefore be dynamic and can change along with changes in selections made by the user (e.g., channel surfing), durations stayed on particular programs, profiles of content being watched, broadcasts saved for recording, history of saved programs, and other related data.

In another embodiment, the widget program executing on the processor of the display device includes a load bootstrap module that automatically generates the request to the remote server, and the remote server performs the examining of the data to authorize the access. By automatically, it is mean that the user does not need to launch programs on his or her computer. On boot-up, the widget program will automatically search for available widgets that are available for the specific display device, will validate through the filters of the server and the manufacturer of the widget, and then display the widget (i.e., application) to the user of the display screen as available.

Figure 3:
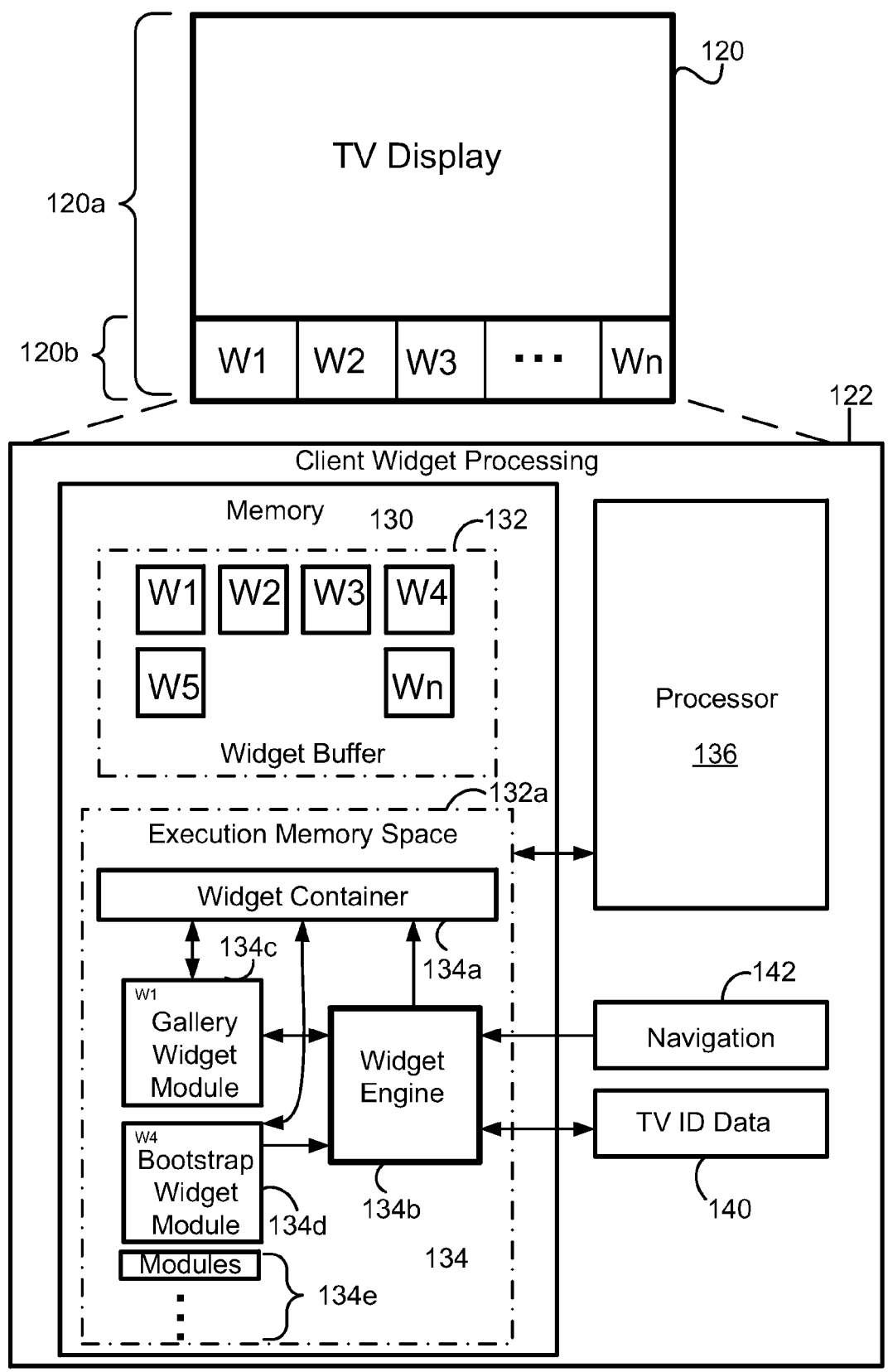
FIG. 3 illustrates a more detailed diagram of a client widget processing integrated in a display device, in accordance with one embodiment of the present invention.

FIG. 3 illustrates a more detailed diagram of the display device 120 and its client widget processing 122. As mentioned above, the display device 120 will have a display space 120a that encompasses the true full space of the screen. A sub-region 120b of the display space is provided where the widgets can be presented. As noted above, this region is the widget dock, which provides graphical representations of widgets that can be accessed by users when selected. The widgets can be active widgets or static widgets when displayed in the display dock 120b. Certain information provided by the widgets can be displayed, scrolled, or interactively moved as video while present in the widget dock illustrated in sub-region 120b.

As shown, various widgets, W1, W2, W3 . . . . WN, are shown installed or viewable in the sub-region 120b. Of course, more widgets or less widgets can be displayed in sub-region 120b. As noted above, sub-region 120b can be positioned at any location on display space 120a. For instance, the sub-region 120b can be on the right side, left side, or top side of the display screen 120a. Additionally, the sub-region 120b can slide up and down to a hidden or open position when presented in any location on display space 120a. In one embodiment, each widget can be separately displayed at different locations on display space 120a, depending on customization desired by a user.

Client widget processor 122, as mentioned above, has memory 130. Memory 130 will include a widget buffer 132. Widget buffer 132 defines the widgets that are loaded on the display device 120. Memory 130 also includes execution memory space 132a that contains various modules that operate at the client widget processing 122 of display device 120. The modules include a widget engine 134b, a widget container 134a, a gallery widget module 134c, a bootstrap widget module 134d, and modules 134e. Gallery widget module 134c may represents the widget W1 that is being executed in execution memory space 132a. Bootstrap widget module represents W4 that is executed in execution memory space 132a. Additional modules 134e represent the different modules that would be loaded in the execution memory space 132a depending on how many of the widgets in the widget buffer 132 storage would be in active mode when rendered on the display device 120.

Processor 136 in turn interfaces with execution memory space 132a to render the execution of the widgets on display device 120. In one embodiment, the widget engine executes upon start-up, which then loads widget container 134a. Widget container 134a includes the rendering styles and graphical illustrations and user interfaces rendered in the widget dock displayed in sub-region 120b. Widget container 134a therefore provides all the user interface and illustration UIs that enable users to navigate through navigation 142 when presented on display screen 120. Thus, in one embodiment, each of the widget applications include a widget container that provides user interfaces for navigating data enabled by a particular widget application.

Navigation commands would then be provided to the widget engine which in turn, communicates with widget container 134a. When navigation requires access to the widget gallery module 134c (a widget), the widget engine would then interface with that specific widget. Widget engine 134b would also be communicating with any one of the modules 134e, which represent the various widgets that would be installed on display device 120. Bootstrap widget 134d is the widget that loads upon startup. Bootstrap widget 134d communicates with widget engine 134b to request that the widget container 134a be installed. The bootstrap widget module 134d, as will be described below, is configured to obtain information from the display device 120, such as TV ID data 140 that would then be provided to the gallery back end systems 104.

Figure 4:
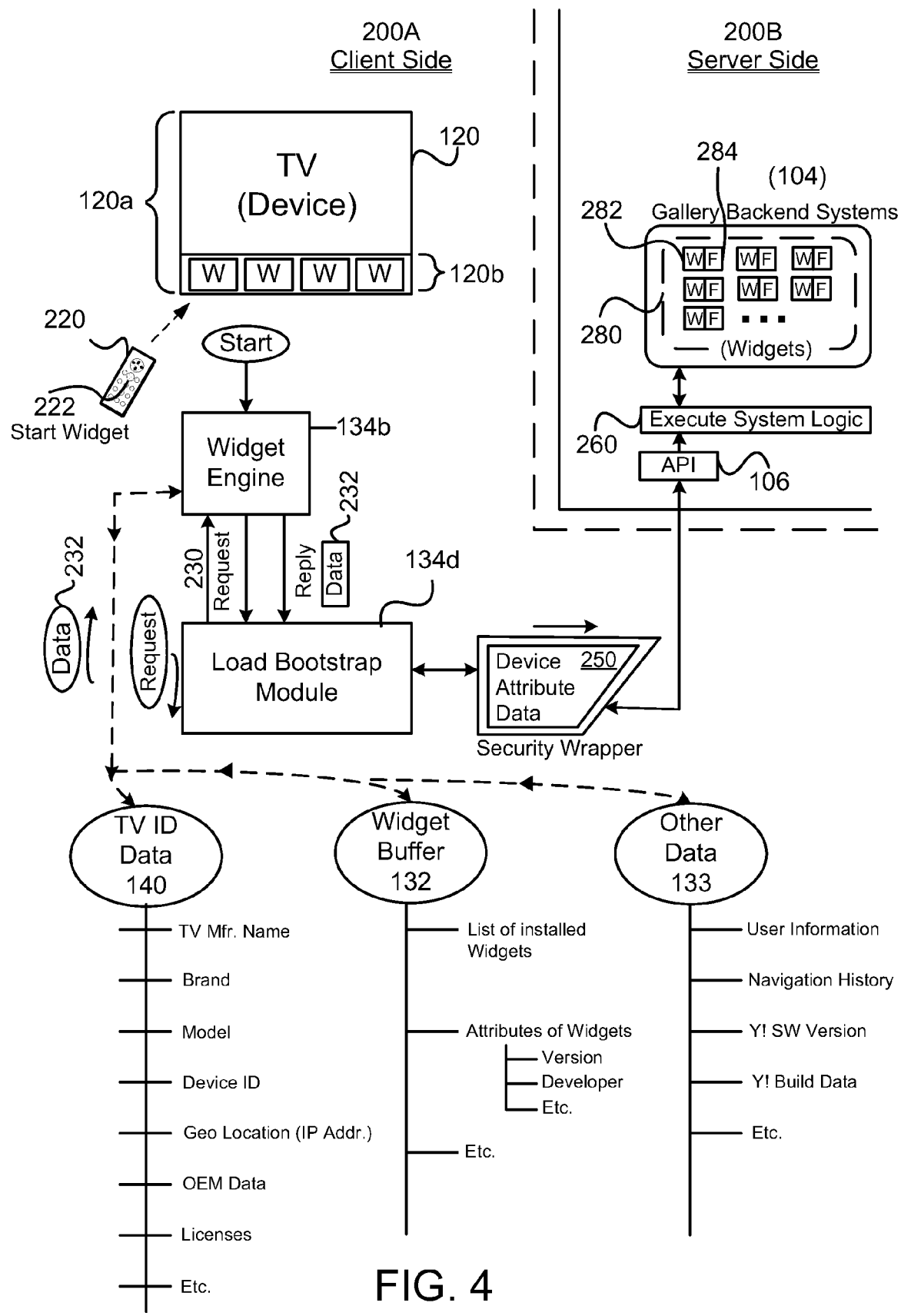
FIG. 4 illustrates a client side and server side interface process for executing a mode boot strap operation, in accordance with one embodiment of the present invention.

FIG. 4 illustrates an example of client side operations 200A and server side operations 200B. Client side operations 200A are shown where a user may communicate with display device 120 to start up widgets using a remote device 220. The remote device 220 may include a button 222 that signals the display device 120 to start up the widget engine. In other embodiments, the display device 120 will automatically start up the widget engine without requiring the user to select a button on the remote device 220.

Furthermore, the remote device 220 can be any device, including a cell phone or any other device having wireless communication capabilities. In short, the remote device 220 should be referred to as an input device that can communicate with display device 120 and interface with one or more widgets that may be installed, or request one or more widgets to be installed on display device 120. In the example shown, the widget engine 134*b* will start at some point and will request the loading of bootstrap module 134*d*. The loaded bootstrap module 134*d* will then trigger a request 230 to the widget engine 134*b*.

The request 230 is then sent to the TV ID data 140, the widget buffer 132, and other data 133 locations on the display device 120 to retrieve information regarding the display device. In one embodiment, the request 230 is used herein in a functional manner, and more than one piece of code or multiple requests, handshakes, or data exchanges can occur to complete the functions upon receiving the request 230.

In one embodiment, TV ID data 140 may include information such as television manufacturer name, brand, model, device ID, geographic location (e.g., IP address), OEM data, licenses, etc. Additionally, the widget buffer 132 may include a list of all installed widgets, and the attributes of the widgets, such as widget version information, developer information, etc.

Other data that may be collected by the request 230 may be, for example, user information, navigation history, Yahoo software version, Yahoo billed data, etc. User information may not be present on a display device if the display device is new brand, but, if users decide to customize settings on the display device and/or sign-in to accounts using the display device, this user information may be stored in memory of the display device 120. In this manner, this information can be retrieved by the request initiated by the bootstrap module 134*d*.

Once this information is collected, data 232 is returned to the widget engine in a reply. The reply is then provided to the load bootstrap module 134*d* that wraps the information, referred to herein as device attribute data 250, in a security wrapper. The security wrapper can be any security algorithm that is configured to secure the information retrieved from the display device 120 and securely transmitted over the internet to the server side 200B. The device attribute data 250 is, in one embodiment, an extensible list of attributes, such as name value pairs that are the result of information obtained from the request 230. The extensible list can be in the form of an XML document, or any other document capable of itemizing the extensible list of attributes. The communication that enables security wrapper can include, for example, transmitting an http query in a URL format that is directed and secured to identify the device attribute data 250 coming from the specific type of display device 120.

For example, the URL may identify that certain device attribute data 250 is coming from a Sony device, a Samsung device, an LG device, or a Vizio device, etc. Each manufacturer would be provided with its own security key so as to provide the proper URL that secures the communication of the device attribute data 250 to the server side 200B. At server side 200B, the device attribute data 250 is received at API 106. API 106 will examine the device attribute data and its URL to determine if access should be provided to the execution system logic 260. Execution system logic 260 will then examine the data and request coming from display device 120 to provide access to the gallery back end systems 104. As a logical illustration, widget data 280 is maintained by gallery back end systems 104, and access can be provided to the various widgets that are part of the gallery back end systems 104. As shown, the various widgets can have widget code 282 as well as filters 284.

The various filters (e.g., in the form of code, logic and data) that are attached (or integrated therewith) to the various widgets or integrated with the widgets, define attributes about the various widgets, who the widgets can be used by, and where they can be accessed, among various other filtering criteria. The filtering criteria can be numerous, and the filtering criteria can be added, modified or adjusted by the developer of the widget, the display device partner, and the manager of the gallery back end systems. In one embodiment, the manager can be Yahoo! Inc., or any other entity that builds a gallery back end system 104.

Figure 5:
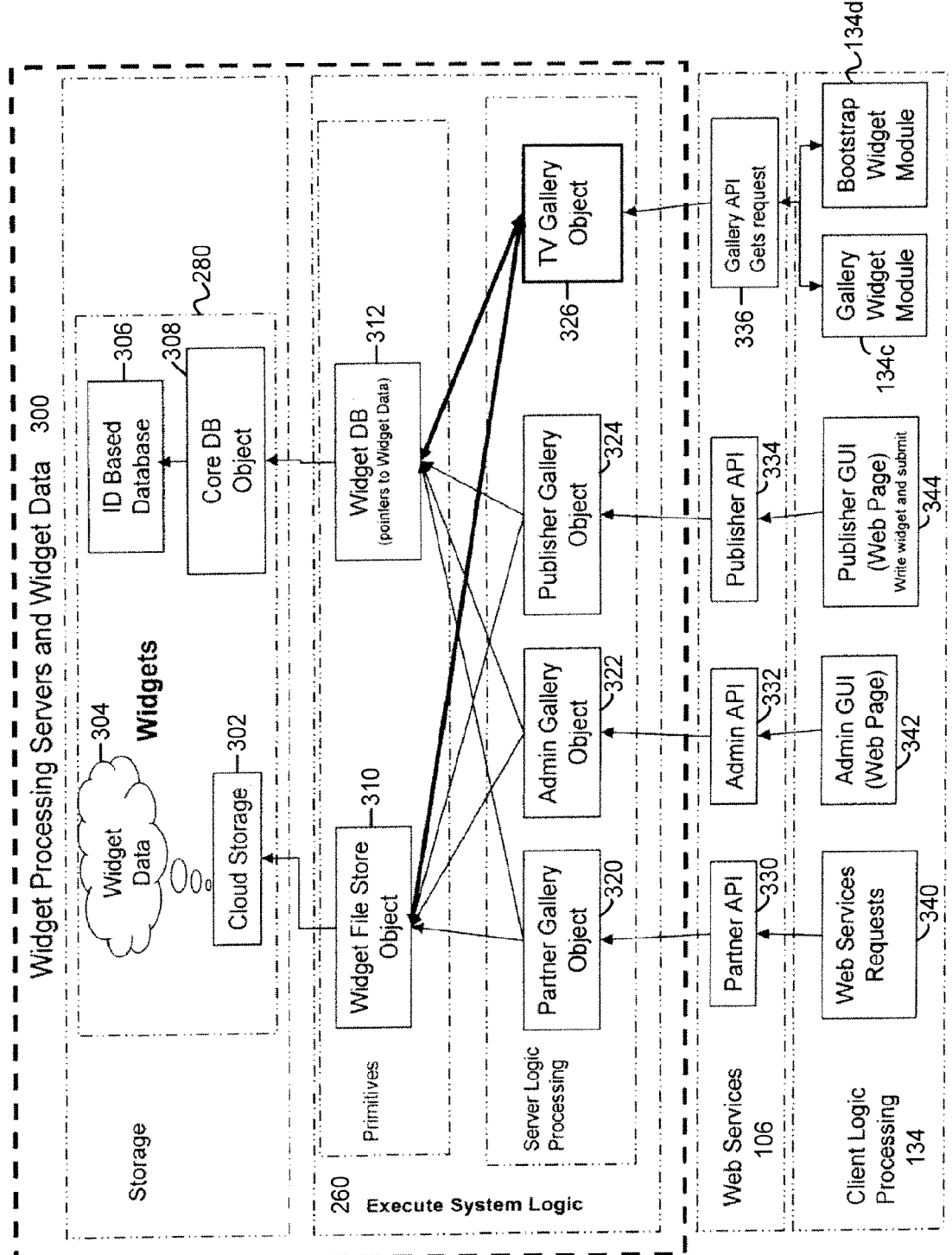
FIG. 5 illustrates a block diagram of the software infrastructure for interfacing with widget processing servers and widget data, in accordance with one embodiment of the present invention.

FIG. 5 illustrates a more detailed diagram of the widget gallery software architecture for providing access to and use of widgets provided by the widget gallery infrastructure 102. In one embodiment, the widget processing servers and widget data 300 are provided by various components shown as the web services 106, execute system logic 260, and storage. Client logic processing 134 is also shown interfacing with the web services 106. Client logic processing 134 can include bootstrap widget module 134*d*, and gallery widget module 134*c*, which are installed in the display device 120. Client logic processing 134 can also include other modules that are accessible to parties through web pages.

Web page access can be provided, for example, through a desktop, laptop, or computing system of a developer, administrator, or third party desiring access to the widget processing servers and widget data 300. Thus, client logic processing 134 should be broadly construed to include both processing software or hardware installed on a display device 120, or software installed or accessed through a computing device (e.g., through web pages, or client software). In this example, bootstrap widget module 134*d* is configured to make web services request to the gallery API 136 of the web services 106.

Gallery API 136 gets the request from the bootstrap widget module 134*d* or the gallery widget module 134*c*, and determines if the request should be allowed, depending on examination of the request, and security access keys as well as filtering data. For example, a widget installed on a display device that was not intended for the specific model of display device, could not operate on that display device, and the request to the gallery API would determine that a request is coming from a device that is not enabled for a specific type of action. Thus, the web services 106 and specifically, the gallery API 336 is configured to examine the request and authorize or deny access for those specific requests, depending on various factors so that only appropriate requests coming from selected authorized devices can make it into the execution system logic 260 of the widget processing servers and widget data 300.

Once the gallery API 336 gets a proper request and is authenticated, the request is provided to the TV gallery object 326 in the server logic processing. The TV gallery object is configured to get data for the request, check business rules associated with the request, and based on a validity, and the validity of the request, the TV gallery object communicates with the widget database 312 to establish primitives that will be used as pointers to widget data stored in storage. As shown, the widget database 312 can access a core database object 308 which then points to an ID-based database 306 to identify the metadata associated with specific identified widgets. The identified widgets would be the widgets that are identified by the request provided through the gallery widget module, or the bootstrap widget module.

The widget database 312 will then provide the relevant metadata information back to the TV gallery object 326 to enable the TV gallery object to reply to the request. The TV gallery object may or may not access the actual widget data stored in the cloud storage 302 that is distributed in widget data 304. Widget files store object 310 can be accessed by the TV gallery object 326 if the TV gallery object 326 determines that it needs specific widget data from the cloud. If the TV gallery object 326 does not need the data from the cloud, the TV gallery object will reply back to the gallery API with the requested data. The requested data would be returned back to the gallery API in the proper format that is based on the format that is expected by the requesting television unit.

For instance, if the request came from a Samsung TV, the request reply would then be wrapped in the proper coating that identifies the request return as appropriate for a Samsung TV. Additionally, the TV gallery object 326 is capable of formatting the requested return data to the requesting television in accordance with not only the type of TV, but other parameters, such as manufacturer ID or other filtering criteria defined by either the manufacturer of the TV, the developer of the widget, or the Yahoo system requirements and filters. As such, the primitives defined by the widget database 312 are configured to provide all the metadata about an object, and it gets pointers for that object. The pointers to the object are passed down to the requesting server logic processing for handling, and for optional access to the widget file store object 310. In one embodiment, the server logic processing modules may or may not get access to all the widget data, and may not request access to the widget store object 310. In one embodiment, in circumstances where new widget data is being uploaded or widget data is being change or updated, the TV gallery object 326 may require access to the widget data stored in the cloud through widget file store 310.

Also provided as client logic processing 134 is a publisher GUI that is provided through a web page. The publisher GUI (graphical user interface), provides a publisher the ability to write widgets and submit widgets to the widget processing servers and widget data 300. The widgets submitted to the system are provided through a publisher API 334 that then provides it to a publisher gallery object 324.

Based on communication between the publisher and the administrator of the execution system logic 260, the widget will be either approved or denied access into the widget data 280 for active use. The interaction between a publisher and the administrator of the system will include online and offline communication to establish the validity of a particular widget to be published. Sometimes the authentication and authorization to publish a widget will require several communications back and forth between a publisher and the administrator of the widget processing servers and widget data 300 so that the appropriate widget protocols are followed when submitted to the widget database. The publisher gallery object 324 includes all the server logic processing to communicate back to the publisher web page so that information regarding the widget to be published is accessible at the web page used by the publisher. In one embodiment, once the widget has been allowed publication into the system, the publisher gallery object 324 will enable the metadata to be stored in storage of the system. The publisher gallery object 324 can then communicate with the widget database 312 as well as the widget file store object 310 to either access metadata, store widget data, or update any one of the metadata stored in the widget data 280 or update widget data in cloud storage 302, 304.

Administration GUI (graphical user interface) can also be provided through another web page or sub-web page 342. This is also part of the client logic processing, as this processing is accessed through a remote computer or a network computer. Administration GUI access through the web page 342 is allowed through a web service 106 to administration API 332. Administration API 332 is then able to communicate, if appropriate, to the administration gallery object 322.

Administration gallery object 322 is also allowed to communicate with the widget database 312, and the widget file store 310. Again, widget database 312 accesses all the metadata regarding a particular widget that is stored in the ID-based database 306. The ID-based database 306 is a database that stores all information regarding particular widgets based on an identification parameter. Other types of databases may also be used so long as appropriate correlation between identified widgets and their metadata can be found and made accessible to a requesting server logic processing through primitives of the execution system logic 260.

In one embodiment, the widget data itself is stored as widget data 304 through cloud storage 302. Cloud storage 302 can be a distributor storage system such as data stores that are connected to various computers that are installed at locations throughout the world. Access to the various data stores can be made through internet protocol communication requests and read and write calls. Client logic processing 134 also includes web services requests 340, which is another module that allows a user through a web page or an application to access partner APIs 330. Partner APIs 330 are part of the web services 106 and will validate whether a particular partner has access to their particular gallery of widgets. Once the partner API has validated a request, the request is then sent to the partner gallery object 320. Partner gallery object 320 is configured to conduct the server logic processing to execute a particular request or action requested by a partner.

The request may be to examine currently loaded widgets in the partner gallery, update widgets in a partner gallery, change filters on a widget in a partner gallery, or remove widgets from a particular partner gallery. Other administrative operations can also be performed by partners by accessing the partner gallery object 320.

Figure 6:
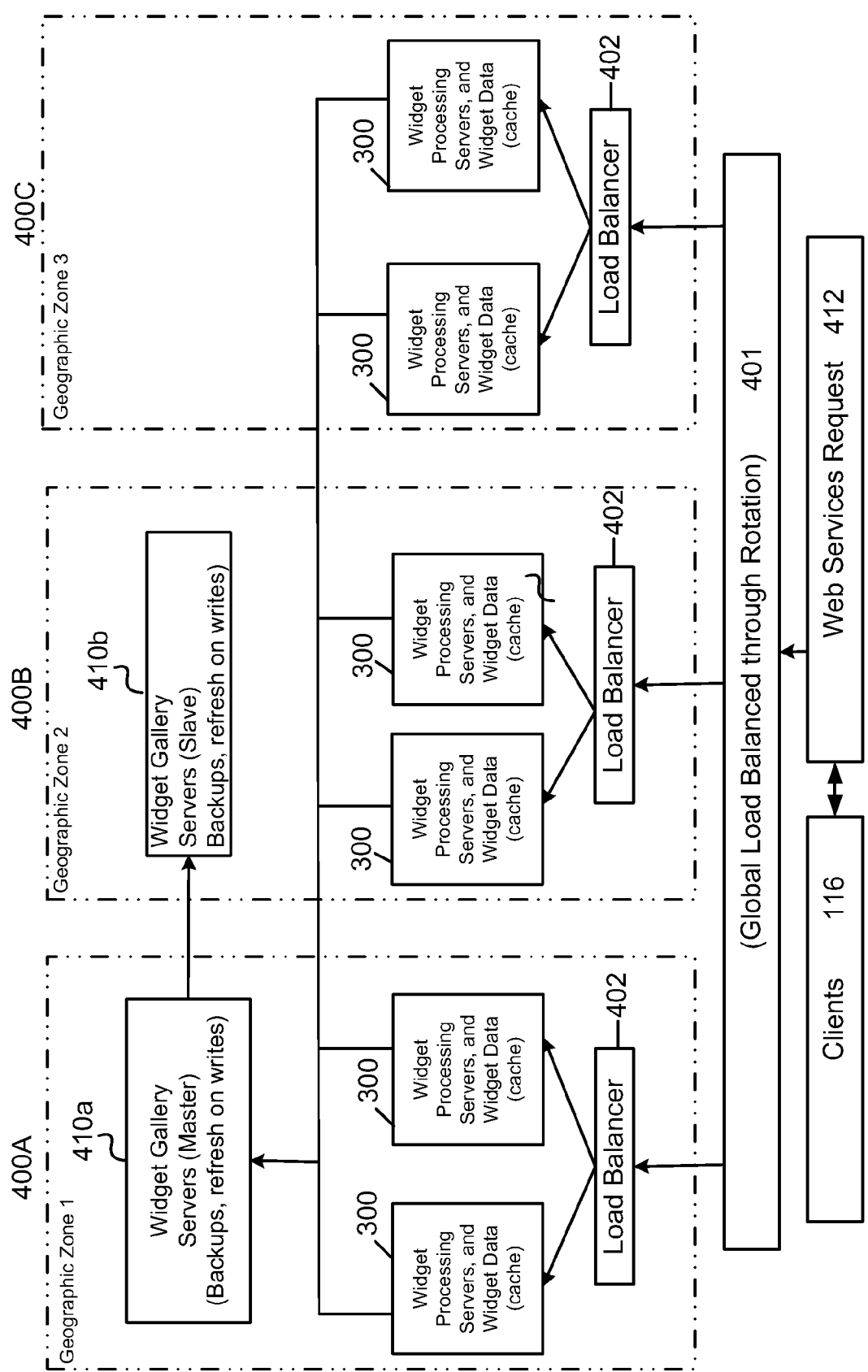
FIG. 6 illustrates a load balancing scheme for distributing processing of widget processing servers and widget data throughout an infrastructure, in response to web services requests received by clients, in accordance with one embodiment of the present invention.

FIG. 6 illustrates a block diagram of a global management system that enables clients throughout the world to access request services from widget processing servers and widget data centers. In one embodiment, the global system is divided into geographic zones, such as geographic zone 1 (400A), geographic zone 2 (400B), and geographic zone 3 (400C). Of course, the geographic zones can increase, depending on demand throughout the globe. For example, if certain regions of the globe increase in demand, additional geographic zone server centers would be added to supply consistent services for the demand However, to ensure service performance, clients are routed through a global load balancing algorithm with rotation (401) that receives web services requests 412 from the various clients 116. The web services requests 412 are examined for geographic location, urgency of the request, and priority given to specific clients 116. The requests are then passed to specific geographic zones to reduce latency and handed off to a specific load balancer 402. Each load balancer 402 is capable of passing the request to two or more widget processing servers and widget data caches 300. The widget data cache is configured to hold a copy of the widget metadata 108 and the widget storage 110.

The widget gallery servers 410a and 410b serve to store all of the widget metadata and provide access to the widget storage 110 that is distributed in cloud storage. Each of the geographic zones will communicate any changes, updates, or new widgets to the widget gallery servers master 410a on any backups, refreshes, or writes to the widget processing servers 300. In this manner, any new data written to or changed in the widget processing servers 300 is communicated to the widget gallery server's master 410a. From time to time, a copy of the widget gallery server's master 410a is transferred to a widget gallery server's slave 410b.

In this example, the widget gallery server's master 410a is located in geographic zone 1, and widget gallery server's slave 410b is located in geographic zone 2. However, the widgets gallery server's master and slave can be located in any zone that is part of the multi-zone geographic system illustrated in FIGS. 5 and 6. By distributing the data to a slave widget gallery server 410b, catastrophic recovery is enabled in case of damage, down time, or failures in the master. If the master is damaged in a way, the slave will become the master, and a new slave will be created in a different geographic zone. The widget gallery servers (master, slave) 410 are shown as servers, but they can be virtually distributed across a plurality of data centers and logically connected to define the widget gallery servers.

Figure 7A:
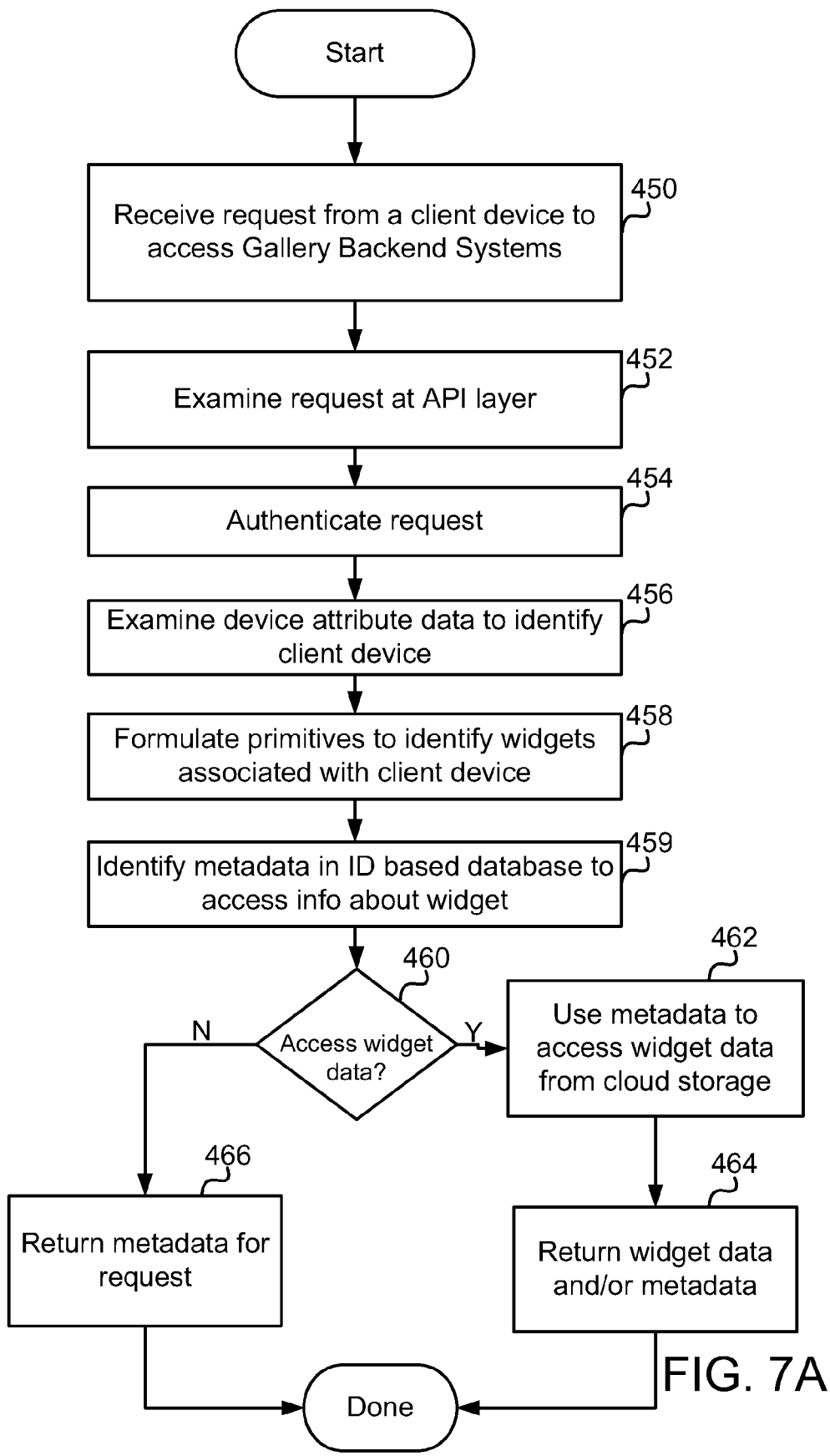
FIG. 7A illustrates a flowchart diagram of method operations performed when receiving requests from a client at the gallery back end systems, in accordance with one embodiment of the present invention.

FIG. 7A illustrates a flow chart diagram defining method operations performed when interfacing with the widget processing servers and widget data 300 of FIG. 5. In the example processing of FIG. 7A, a path will be defined to access the widget processing servers and widget data 300 of FIG. 5 through a gallery widget module 134c in the client logic processing 134. The widget gallery module 134 will communicate the gallery API 336, the TV gallery object 326, the widget database 312, the widget file store object 310, and the widgets 280.

The operation in this example begins in 450 where the request from a client device is received to access the gallery back end systems. The request would be examined at the API layer 452 to determine if the request is appropriate and the requesting entity is entitled to access the requested information from the widget processing servers in widget data 300. Operation 454 performs an authentication on the request during the communication between the gallery widget module and the gallery API that gives the request. In one embodiment, the authentication utilizes Hypertext Transfer Protocol Secure (HTTPS) as a combination of the Hypertext Transfer Protocol with, for example, the SSUTLS protocol to provide encryption and secure identification of the server. As is known, HTTPS connections are often used for payment transactions on the World Wide Web and for sensitive transactions in corporate information systems. In this embodiment, HTTPS is used to create a secure channel over an insecure network. The trust inherent in HTTPS is based on major certificate authorities, which are pre-installed in browser-type software code loaded on each display device.

In operation 456, the device attribute data is examined to identify the client device. As noted above in FIG. 4, the device attribute data 250 which may be a plurality of name values pairs, is examined to determine if the client device (television) has access to the requesting information, and examines what widget data is viewable and accessible to the requesting device. The examination includes looking at the request and the device attribute data to filter, and match parameters between the requesting device and the widget gallery. For example, the widget gallery provides multiple views of a single database that gives each device its own set of widgets.

The device provides an extensible list of information, and a matching operation is performed to identify the set of widgets that are appropriate to the requesting device. Accordingly, the communication between the client device and the service device operates to create a connection where matching occurs between the requesting device and data provided by the widget gallery. The filtering provided on the widget data enables the system to appropriately match which widget information will be provided for viewing, accessing, and interfacing with by the particular device.

As noted above, each device may be made by a different manufacturer. Each manufacturer is referred to herein as a partner. The manufacturer can have many models of television sets, and each model can have different configurations of software or hardware. Accordingly, it is not sufficient to only match the brand device to the widget gallery, but also the specific model, revision, hardware, and software loaded on the specific partner device (television), to then present the view of the database to that specific device. Of course, each device will view only the part of the database that is appropriate for that specific device while other devices connecting to the system will have similar and overlapping views of the widget gallery, but in reality, each view of the widget gallery to each partner will be different, depending on the filtering provided and integrated within each of the widgets, metadata of the widgets, and/or code integrated into the widgets by the developers.

Continuing with operation 458, primitives are formulated to identify widgets associated with the client device. The primitives identify, based on the filtering, which widgets will be accessed from the widget data 280 (FIG. 5), based on the above-mentioned filtering. In operation 459, metadata is identified in an identification-based database to access information about the specific widgets requested by the gallery widget module 134.

The ID-based database will allow the widget database 312 to point to specific metadata that defines all the attributes of the specific widgets requested for access, viewing, and/or interfacing by the gallery widget module 134c or other widgets or modules. In operation, most accesses to the widget data 280 will reside only in the widget metadata provided by the ID-based database 306 and core database object 308. Core database object 308 provides the access logic to identify the specific widget data in the ID-based database 306. In a majority of cases, access will only be required to the metadata itself, and not to the widget data that is stored in the cloud storage 302, and widget data 304.

However, if access is desired to the actual widget data, a check 460 is performed to determine if the request coming from the gallery widget module requires access to the widget data. If access is required by the gallery widget module to the actual widget data stored in the cloud storage (e.g., to make a write, update, or upload), the metadata obtained by the widget database 312 of FIG. 5, will be used to point to specific data in the cloud. For example, in operation 462, the metadata is used to access the widget data from the cloud storage. In this operation, with reference to FIG. 5, the TV gallery object 326 will obtain the pointers to widget data from widget database 312, and then TV gallery object 326 will pass the pointers to the widget file store object 310.

Widget file store object 310 will then form the primitives that will allow access to cloud storage 302, and ultimately to the widget data 304. In operation 464, the widget data that is obtained from cloud storage is returned, and/or the metadata, to complete the request by the gallery widget module 134c. If, in operation 460, access to the widget data is not required, only the metadata will be returned in response to the request by the gallery widget module 134.

Figure 7B:
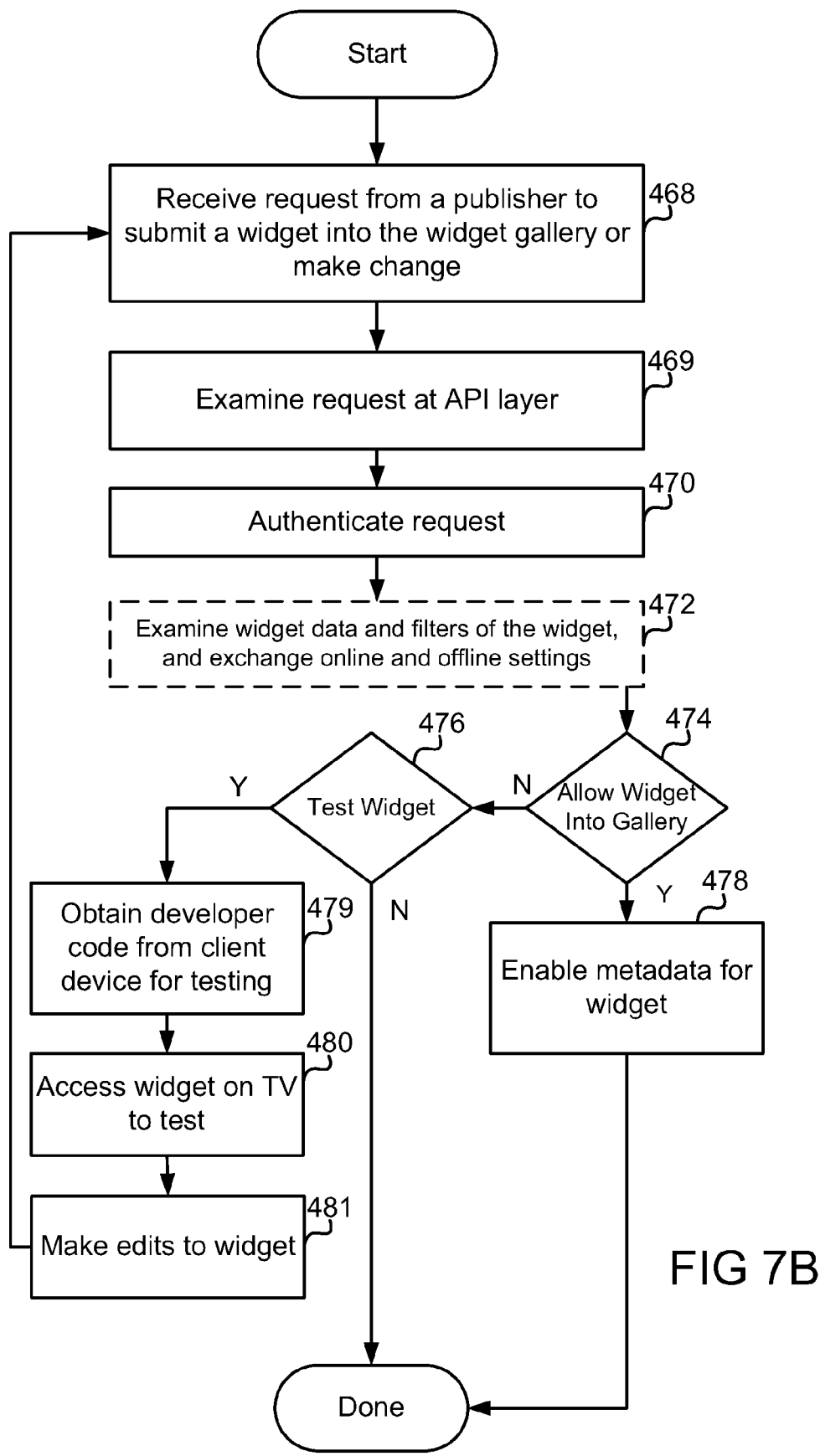
FIG. 7B illustrates an example flowchart of a request received from a publisher, in accordance with one embodiment of the present invention.

FIG. 7B illustrates an example of a request from a publisher to submit a widget into the widget gallery and/or to make a change to a widget in operation 468. With reference to FIG. 5, the operation would be carried out through module 344. Module 344 would be in the form of a web page that provides access to a publisher geographical user interface. The publisher communicates to the publisher API 334, and in operation 469, the request is examined by the API layer. The request is authenticated during the communication in operation 470.

Operation 470 is shown following operation 469, but it should be appreciated that the authentication occurs during the connection and transmission between the publisher GUI 344 and the publisher API 334 to ensure a secure communication port. In operation 472, the widget data and filters of the widget are examined, and exchanges between the publisher and customer service engineers that manage the widget processing servers, will occur to define the settings for the widget data and filters. This process can occur over a plurality of sessions, days, or even months during the development of a specific widget for inclusion into the widget gallery. Once the customer service engineers and the publisher come to an agreement on the settings, and content of the specific widgets that will be loaded on the gallery and associated filters, operation 474 will determine if the widget will be allowed into the gallery. If the widget is allowed into the gallery, operation 478 will enable the metadata for the widget so that the widget will be accessible to users of specific display devices that can present the widget in a specific widget dock for access to the services and interfaces provided by the publisher's widget.

If the widget is not allowed or is not ready for inclusion into the widget gallery as an active widget, operation 476 will allow for testing of the widget. Testing of the widget can occur in operation 472 as well during the transactions and exchanges of data, settings, and other information between the widget customer service engineers and the publisher. However, for a logical understanding of the testing that can be involved by a publisher or developer, operation 479 allows the developer of the code to obtain a specific developer code from a particular television for testing of its code.

In one embodiment, which will be illustrated in FIG. 12 below, the developer can access the widget gallery of a specific display device 120 to allow the developer to access a developer code. The developer code will be displayed on the television, and the publisher can then enter that code into a specific request form on the publisher's GUI web page 344. Once the connection between the publisher and the specific display device is made, the developer is allowed to access his or her widgets for testing on a specific display device in operation 480. Based on the performance and testing made by the developer and publisher, the developer can make edits to the widget in operation 481. At that point, if the developer is satisfied with the performance of the widget, the publisher can then again request access to the widget processing servers to re-submit the widget in operation 468.

It should be understood that the above-mentioned operations do not have to happen in the sequence illustrated, and in some cases, some operations are performed offline, and some operations are performed online, over a period of time to enable the correct definition of a widget for submission into the widget gallery.

Figure 7C:
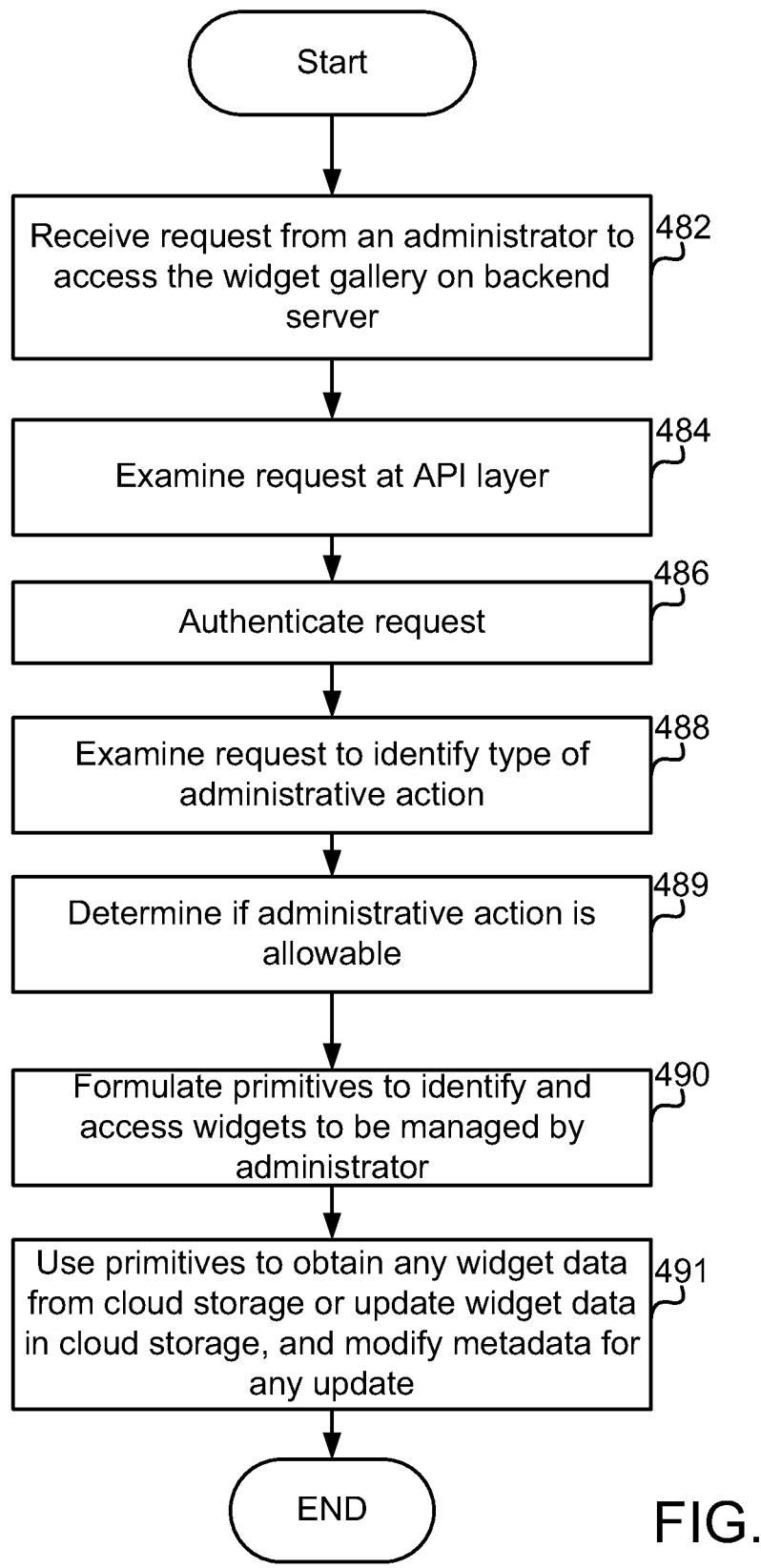
FIG. 7C illustrates a flowchart diagram of a request received from an administrator accessing the widget gallery back end systems, in accordance with one embodiment of the present invention.

FIG. 7C illustrates an example where a request for an administrator to access the widget gallery on the back end server is received in operation 482. With reference to FIG. 5, the request would come from an administrator GUI (graphical user interface) web page 342. This request is then passed to the administrator API 332, where the request is examined at the API layer in operation 484. The request is authenticated in operation 486. The authentication, as described above, will occur during the communication with the API layer, and during the continuous communication with the back end server.

In operation 488, the request is identified to determine the type of administrative action that is requested through the admin GUI 342. The admin gallery object 322 includes the server logic processing required to examine the type of administrative actions requested. Some administrative actions may be allowed, depending on the service level, the partner level, and/or the type of widget that is being modified, accessed, or interfaced with through the administrator GUI 342. The admin gallery object 322 will also perform logic to examine the filters associated with the various widgets, and only allow certain administrative actions if the filtering defines the matching required to allow the specific admin GUI to make the specific changes to the particular widgets in the widget gallery. If the administrative action requires access, viewing, or changes to specific widgets, the admin gallery object 322 of FIG. 5 will access the widget database 312 to then access the metadata of the specific widgets.

If access to the actual widget data is required, the widget database 312 will return the pointers to the widget data back to the admin gallery object 322, which then communicates it to the widget file store object 310. Widget file store object 310 will then access the cloud storage 302, which will then access widget data 304. The widget database 312 and the widget file store object 310 will formulate the specific primitives to identify and access the widgets to be managed by the administrator in operation 490 of FIG. 7C. As noted above, the primitives will be used to obtain any widget data from the cloud storage or update widget data in the cloud storage, and modify metadata for any updates.

FIGS. 8A through 8E illustrate examples of widgets stored on the widget gallery 280. As noted above, the widget gallery 280 is defined by metadata for each of the widgets installed on the widget gallery, and separately, the actual widget data that is stored in the cloud storage 302 and 304. However, to provide a logical illustration of widgets stored in the widget gallery 280, example thumbnails of widgets are provided to identify the filtering code that is integrated or associated with the specific widgets.

Figure 8A:
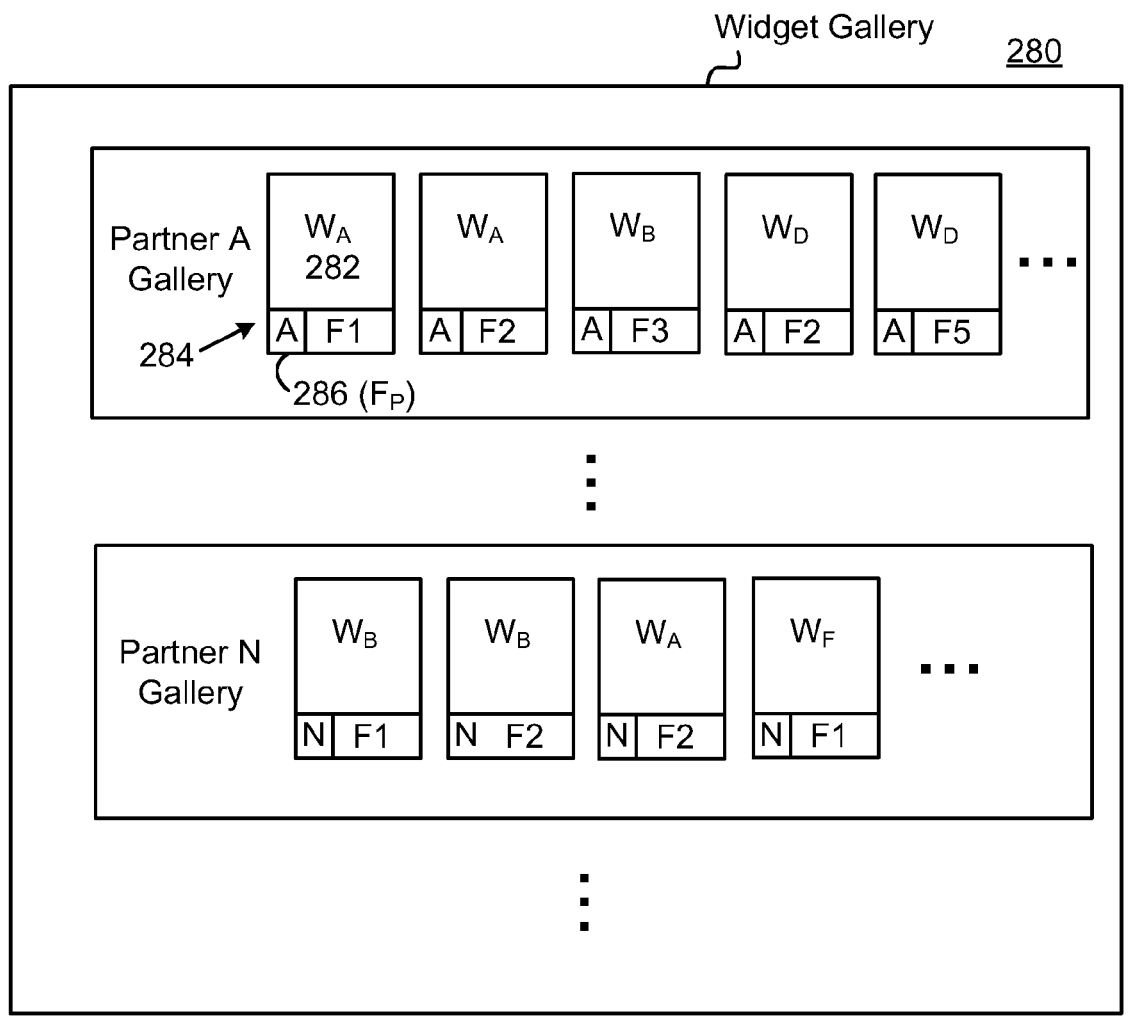
FIGS. 8A through 8E illustrate embodiments of filtering widgets in the widget data, in accordance with one embodiment of the present invention.

In FIG. 8A, it is possible for each partner (e.g., television manufacturer), to have their own partner gallery where a plurality of widgets are contained to allow the various television models of that partner to access those specific widgets that they desire to have on their television sets, or those widgets that have publishers that have agreed to partner with the specific television manufacturers. It should also be understood that each partner gallery may include various versions of the same widget (e.g., $W_A$), ($W_D$) that will be installed in the partner gallery. For example, certain widgets, like widget $W_A$, may be installed in the partner gallery and will include different versions of the same widget. Some versions may be newer, or older, and certain widgets may have different functionalities, but are essentially the same. As a concrete example, if widget $W_A$ is a weather widget, one weather widget may provide for scrolling weather text at the bottom of the widget when installed in the widget dock. However, the same widget may be provided in the partner gallery where the same widget will not include the scrolling text in the widget icon when installed in the widget dock. This simple example is provided so that understanding is clear that the same widget may have different instances, and each instant may have a different functionality or update, depending on the various widgets that are targeted for different partner display devices.

In one embodiment, the widgets are differentiated by associating therewith a filter 284 that defines the identity of the widget. The filtering is illustrated as F1, F2, F3, F2, F5, etc. In addition, the filtering can also include information such as what partner gallery the widget belongs. In this example, a partner identifier filter A is provided on each of the widgets that belong to the partner A gallery illustrated in FIG. 8A. In the same token, all other partner galleries will include different filters to identify different versions, functionalities, features enabled, restrictions, or different settings. Additionally, the different filters will identify which of the widgets belong to what galleries so that when a display devices access the widget gallery, each display device (by providing its extensible set of information), will be matched to the specific widgets in its widget gallery instance.

Accordingly, this filtering provides for a seamless integration between the widget gallery for each widget partner, and for each widget partner, a sub-set of those widgets that will be displayed on specific display devices, based on the dynamic filtering and matching that occurs when an interface is made between a specific display device and the widget gallery.

Figure 8B:
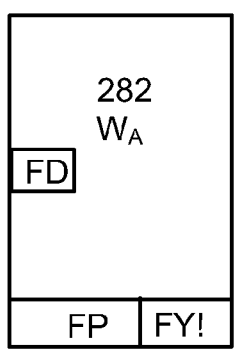
Figure 8C:
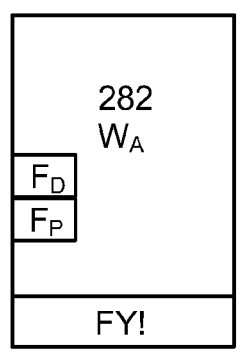
Figure 8D:
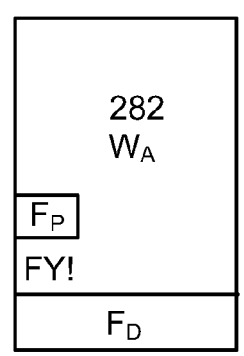

FIGS. 8B, 8C, and 8D illustrate examples where the filters are integrated in different parts or time during the creation of the specific widgets 282. In one embodiment, the filter may be a filter that is added by a developer ($F_D$), and this filter will be integrated into the code of the widget 282. This filter may define what manufacturers are allowed to use the specific widget, or which models of television sets will be allowed to use the specific widget. If the widget requires a type of television set to play the widget, television sets that don't have the capability or space or other requirements for the widget will not be allowed to play the widget.

Accordingly, the developer has access to set parameters within the widget code to enable filtering and matching to the specific devices when access to specific galleries is desired through the user interface of the widget dock on a specific display device. Additionally, the filtering may be added by the publisher ($F_P$), and/or the provider of the service (e.g., Yahoo! Inc.), ($F_{Y!}$). FIGS. 8C and 8D illustrate different ways of integrating the different filters, whether they be added directly into the code of the widget, or as an added code once the widget is created. The flexibility of adding filters during the creation of a widget, after creation of the widget, or when circumstances change at a later point in time, provides a flexibility to the system to filter and match the specific widgets to the specific devices upon request so that the devices viewing the gallery will view a single database that includes all the widgets that are either available to the device or loaded on the device, and are compatible with the device without requiring user interaction or user configuration.

Providing automatic association and matching between widgets to specific devices removes the complexity of having to set up the device, and/or program a device to communicate with specific widgets from different providers. In essence, the automatic association between available widgets for available device removes complexities and problems associated with programming, downloading, and configuring software or hardware that is usually a bottleneck when accessing and downloading software onto personal computers. This seamless integration of the filtering of widget data and widget metadata to specific devices therefore streamlines and facilitates the use of the widget gallery to the specific devices without complex knowledge of software, hardware, or settings associated therewith.

Figure 8E:
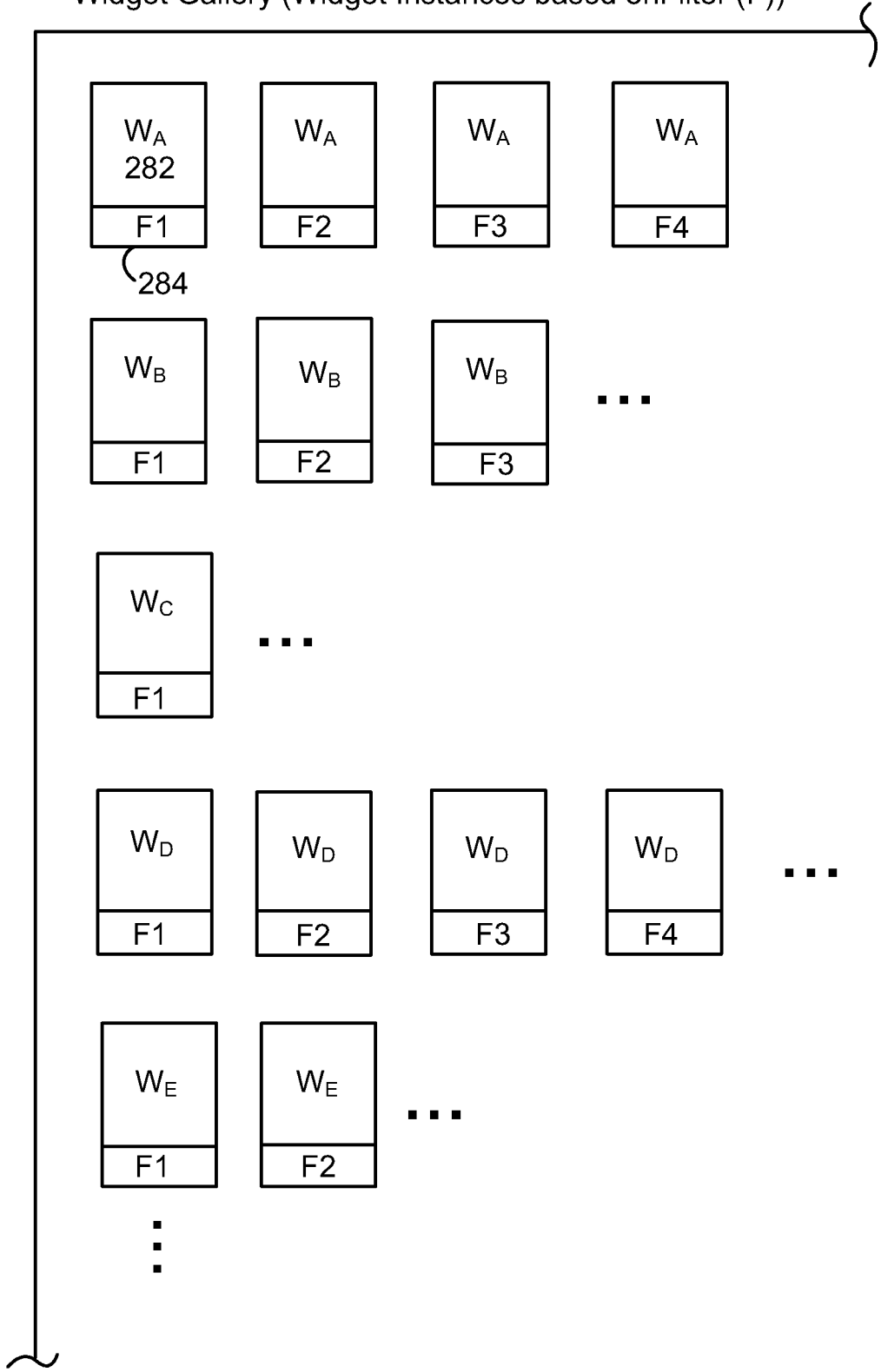

FIG. 8E illustrates an example of the widget gallery 280 where many instances of the same widget are provided with different filters 284. The different filters 284, as mentioned above, will be used to differentiate the different instances of the same widget that may be present in the widget gallery. In the example of FIG. 8E, the widgets are not associated to specific partner galleries, but additional identifier information resident in the filters can be used to do the filtering per partner gallery. Accordingly, the illustration of FIG. 8E is provided to illustrate that the same widget can have many instances, and the various instances are provided to provide matching to specific devices, specific partners, and/or restrictions to use at specific times or geographic locations.

Figure 9:
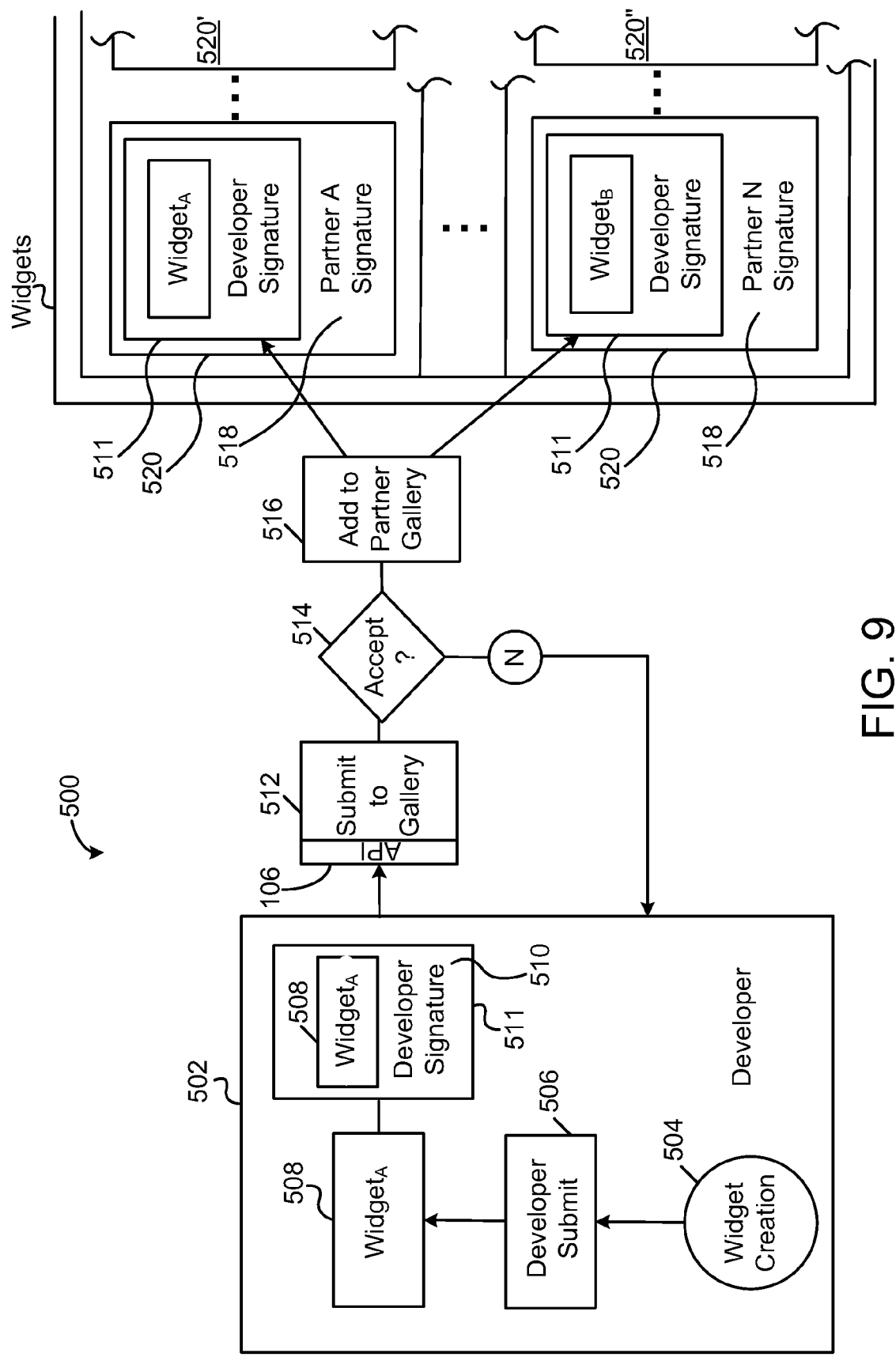
FIG. 9 illustrates an example of security signatures applied to widgets, in accordance with one embodiment of the present invention.

FIG. 9 illustrates an example of the widget gallery authentication process for securing widgets when provided to the widget gallery. In this example, operations 502 include developer activity such as widget creation 504, and developer submit processes 506. Once the developer has engaged in the submission process 506, the widget 508 is created and ready for submission and/or testing.

Before submitting widget 508, widget A, in one embodiment, is signed by a developer signature 510. Signature 510 is created using a widget converter tool to sign a widget to define a certificate. In one embodiment, signing the widget can include using a widget converter tool to sign a widget using X.509 certificate encoding that is a cryptographic process. X.509 is the standard for a public key infrastructure (PKI), for a single sign-on (SSO), and a privilege management infrastructure (PMI). X.509 specifies, among other things, the standard formats for public key certificates, certificate revocation list, attribute certificates, and certification path validation algorithms. It should be understood, however, that other security algorithms may be used instead of X.509, so long as the widget is communicated in a secured (or encrypted manner) when submission or communication is made with the widget gallery.

In one embodiment, widget applications in the specific application widget gallery include one or both of a developer signature and a partner signature to secure communication of widget applications from developers to the remote server.

By securing each of the widgets, accessing the widgets once in the widget gallery will also include decryption (or keys) or access to the widget data and widget metadata, only after confirming that the requester has access to the certificates or keys defined by the developer signatures 510. In the example of FIG. 9, the signed widget 511 is then submitted to API 106 to submit the widget to the gallery in operation 512. If the widget is accepted, then operation 514 transfers it to operation 516. Operation 516 will allow the partner to add it to a specific gallery. The partner, before adding it to the specific widget gallery, will also sign the widget 511 by adding a partner signature 518. Accordingly, the widget will have a double signature once the widget is installed in the library as widget 520. In other embodiments, one signature may be sufficient or more than two signatures are possible, if Y! adds security signatures after approving widgets. Multiple widgets 520 will then be installed for a specific partner as illustrated in FIG. 9. Again, this representation is only a logical representation of the data; however, the data is stored as metadata, and widget data is stored separately, as illustrated in FIG. 5.

Before the widgets are installed, at install, the signatures are checked using keys that are installed in the partner's display device to confirm that the widgets are appropriate for the specific device. If the signatures are not authentic, the widget will not be installed onto the display device. Accordingly, the widgets 520 in FIG. 9 may represent the widgets that are or can be installed in specific display devices after they were authenticated for use on the specific display device. For instance, some manufacturers, such as Samsung, will only want certain widgets to be installed on their display device, and the partner signatures will allow for an additional filtering of the widgets that are allowed to be installed into the widget buffer 132 (of specific devices), as shown in FIG. 3.

Figure 10:
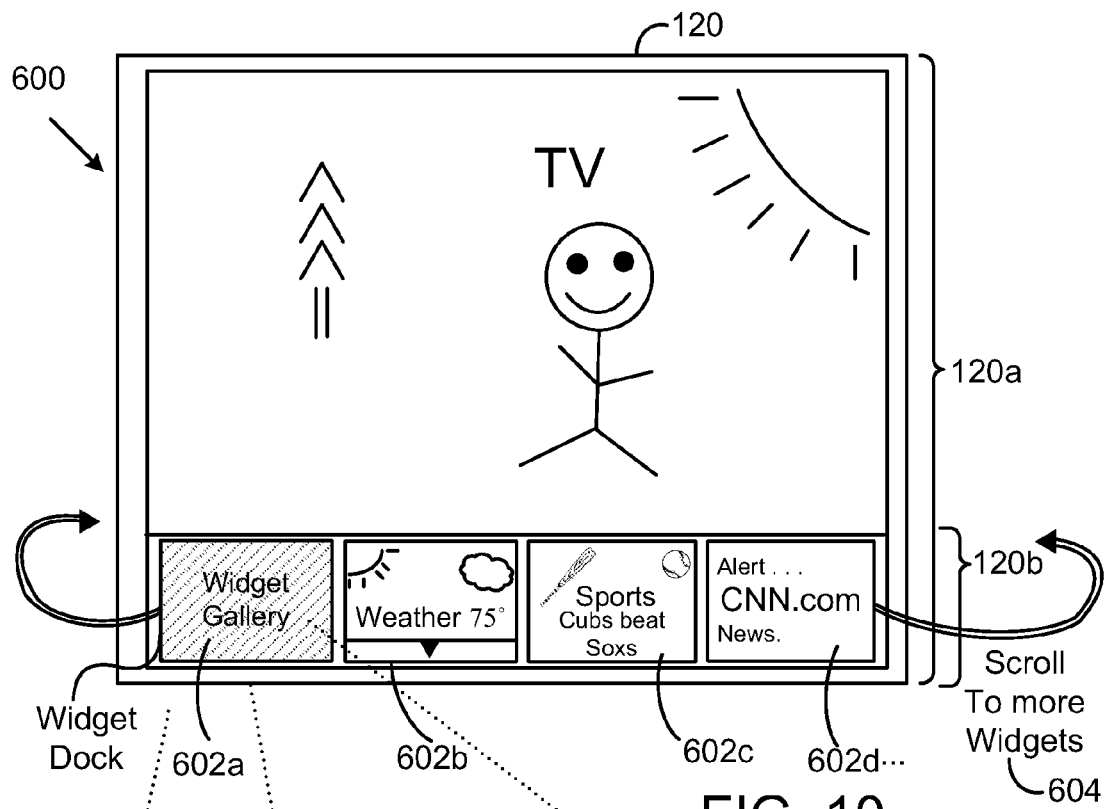
FIG. 10 illustrates a display screen and a widget dock for allowing access to widgets installed on a display screen, in accordance with one embodiment of the present invention.

FIG. 10 illustrates an example of a display device 120 from a specific manufacturer that includes the display area 120*a* and the sub-region 120*b*. The sub-region 120*b* will include the graphical user icons for the widget gallery and the various widgets that are displayable in the sub-region 120*b*. In one embodiment, the sub-region 120*b* is referred to as a widget dock 610 because the different widgets fit and are organized within the sub-region 120*b*. Widget gallery 602*a* is the widget gallery module that provides access and interface to the different functionality and settings of the widget gallery accessible to the specific display device 120.

For example, users can access the widget gallery 602*a* using a remote 222, and select different widgets to install, widgets to remove, or updates to the system or other administrative functionalities. By using the arrow keys on the remote or other suitable wireless device, the user can scroll to the right and select on the weather widget 602*b*. The user can also select other widgets 602*c*, 602*d*, and so on. The widget dock 610 operates with a scrollable operation that allows users to scroll to the left or scroll to the right to access different widgets that may be installed on the specific display device 120. The scrolling functionality 604 allows for display of more widgets in the widget dock 610 during the use of the widget gallery and its various widgets installed in display device 120, as illustrated in system 600.

Although the widget dock 610 is shown at the bottom portion of the display device 120, the widget dock can be installed in different regions of the display device, depending on the user's customization or likes and dislikes. In one example, the widget dock 610 may be installed on the left border of display device 120, the top border, or the right border. Still further, the widget dock 610 may be installed directly in the center of the display device 120, and the size of the widget dock can expand or contract, depending on the preferences of the user. Accordingly, it should be understood that the widget dock 610 can have many configurations so long as access is provided to the different widgets and the functionalities provided by the widget dock 610.

In one use example, the user may select the sports widget 602*c*. The sports widget 602*c* may be provided by a developer and a partner to provide access to their specific content over the internet. An example sports widget may be one provided by Yahoo! Inc., and the various sports sites and interfaces would be displayed on display device 120. Additionally, third party content partners may develop their own widgets, such as CNN.com widget 602*d*. CNN widget 602*d* would then provide an interface that would be displayed on display device 120 to the user when selected. The content and data provided by widget 602*d* would be the content and data and functionality provided by the third party partner CNN.com. Interfacing with the content and data would be over the internet to the servers, and content that is managed by CNN.com. Accordingly, the type of widgets (applications) that can be provided in widget dock 610 are endless, and can provide functionality when selected or can display interactive information directly in the widget dock, depending on the functionality defined by the developer of the specific widgets.

Figure 11:
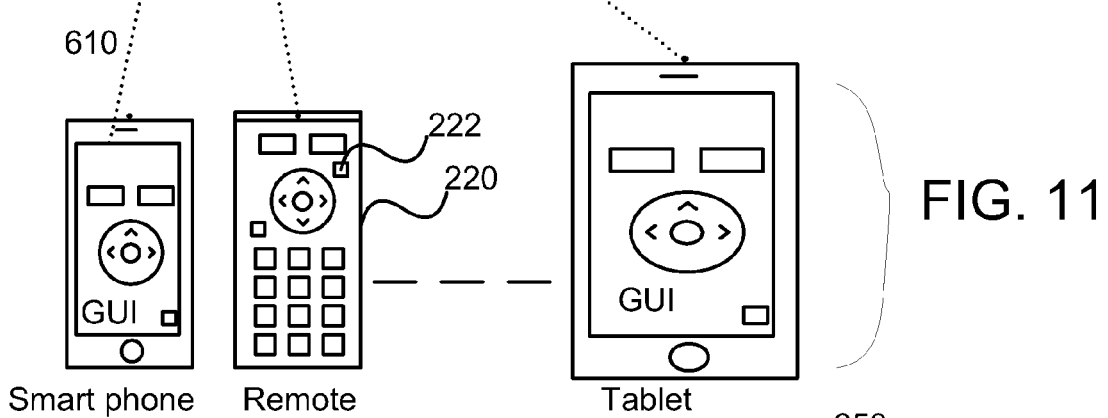
FIG. 11 illustrates an example of remote device for accessing widgets on a display device, in accordance with one embodiment of the present invention.

In FIG. 11, remote 222 is shown, which provides access to the display device 120. In other embodiments, other interfacing devices, such as cell phones, smart phones, and other wireless communicating computing devices can be linked to the communication interface of display device 120. Additionally, other devices, such as tablet computers, laptops, or other devices capable of rendering a user interface (i.e., GUI), can be used for interfacing wirelessly with the display device and applications executing thereon. Accordingly, the interfacing with widget dock 610 is not limited to a remote 222 provided by display device manufacturer 120, but can be linked or paired with any other wireless communication devices.

Figure 12:
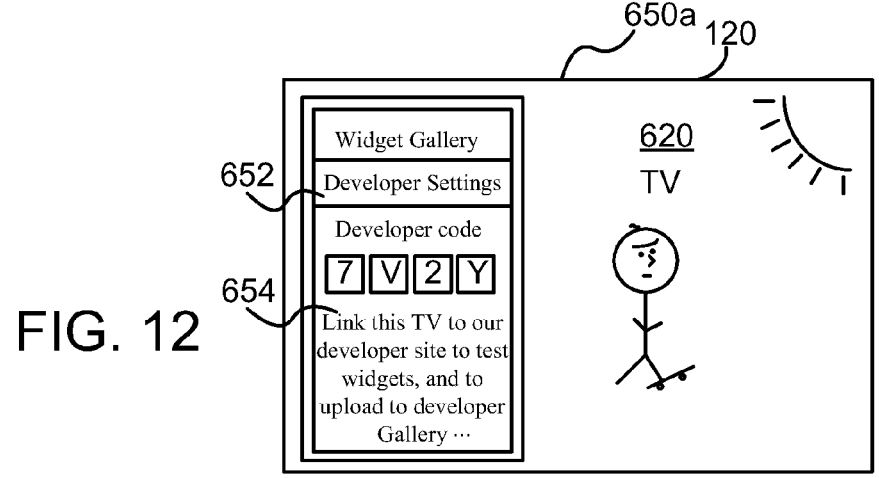
FIG. 12 illustrates an example widget gallery user interface provided on a display screen, in accordance with one embodiment of the present invention.

FIG. 12 provides and example of a user accessing the widget gallery 602*a* of FIG. 10, and navigating to the widget gallery developer settings 652. In region 654, a developer code is presented by the specific television set of display device 120. This developer code can then be used by the developer to pair this specific display device to the publisher's testing of a specific widget as described with reference to FIG. 5, and the publisher GUI web page 344.

By using this functionality, a developer can test its widgets directly on their current television set without making the widget public to other televisions having the appropriate filtering. This pairing of the specific display device to the specific developer's testing provides an advantageous solution for live testing of the widget on a display device without having to rely on testing platforms that may not resemble the exact presentation that will ultimately be available on a display device 120.

Figure 13A:
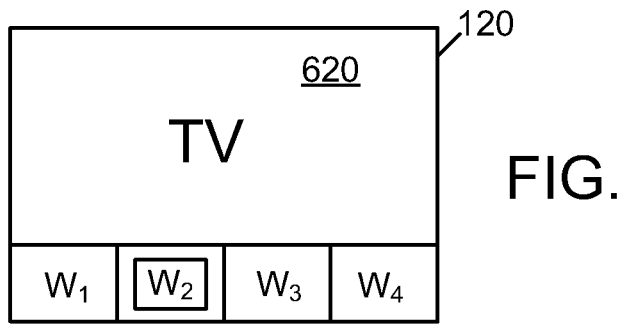
FIGS. 13A through 13D illustrate examples of using widgets on a display device, in accordance with one embodiment of the present invention.
Figure 13B:
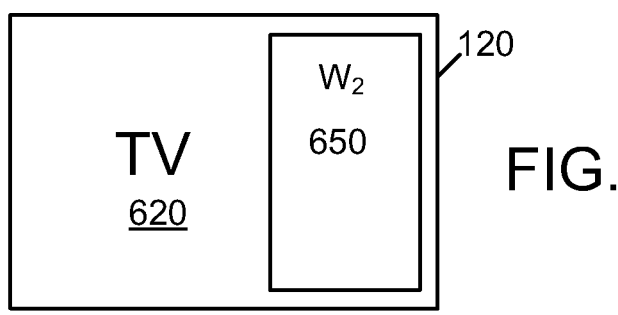
Figure 13C:
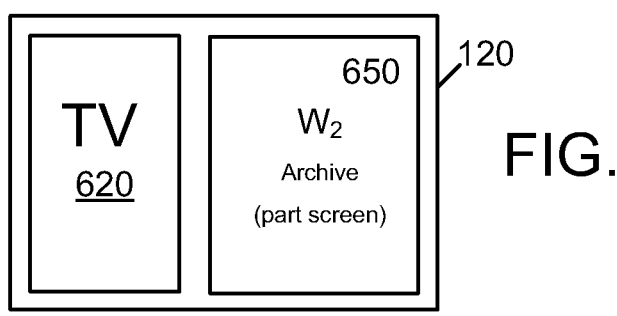
Figure 13D:
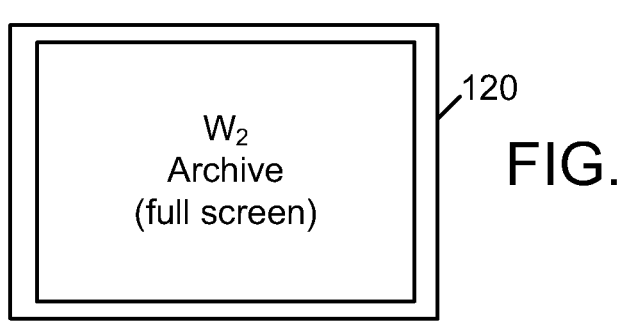

FIGS. 13A through 13D provide examples of a display device 120 where the different widgets "W" can be displayed in the widget dock, or expanded in widget regions 650, on display device 120. Widget region 650 can be presented at any location on the display device 120, and can take up part or all of the display device television region 620. In the example of FIG. 13C, the television region 620 and the widget active region 650 can split the screen to allow web surfing on region 650, and TV watching in region 620. In still another embodiment, the widget could take up the full active screen in FIG. 13D. In one embodiment, each widget application provides functionality for rendering an extended window over part or all of a screen of the display device, and the extended window provides a graphical user interface for accessing internet data enabled by the widget application.

The full active screen would be taken up in circumstances where the widget is providing a full screen rendering of the functionality provided by the widget. For example, if the widget is an on-demand widget from a video on-demand provider, the video selected through the widget would then be displayed on the full screen. In other embodiments, less than the full screen could also be possible if the video does not require or the user does not want to occupy the full screen for the on-demand video.

Figure 14:
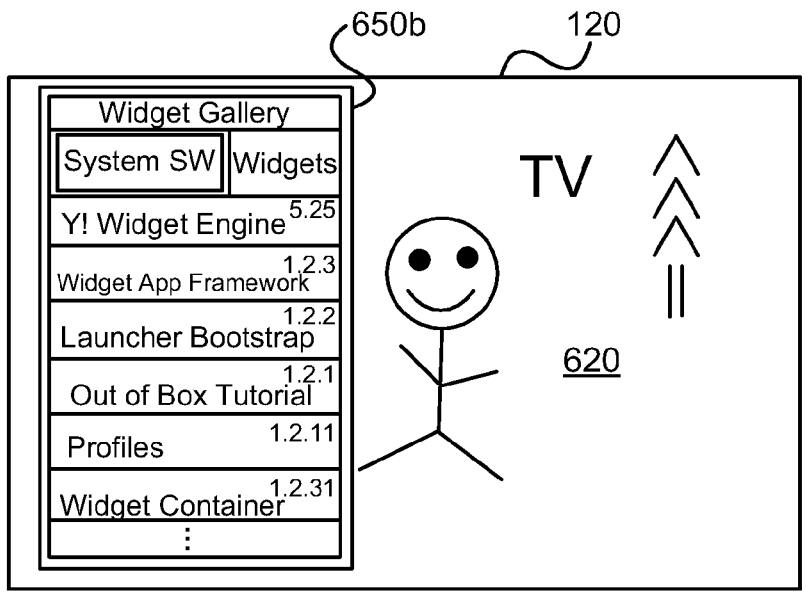
FIGS. 14 through 16 illustrate examples of user interfaces provided by the widget gallery, in accordance with one embodiment of the present invention.
Figure 15:
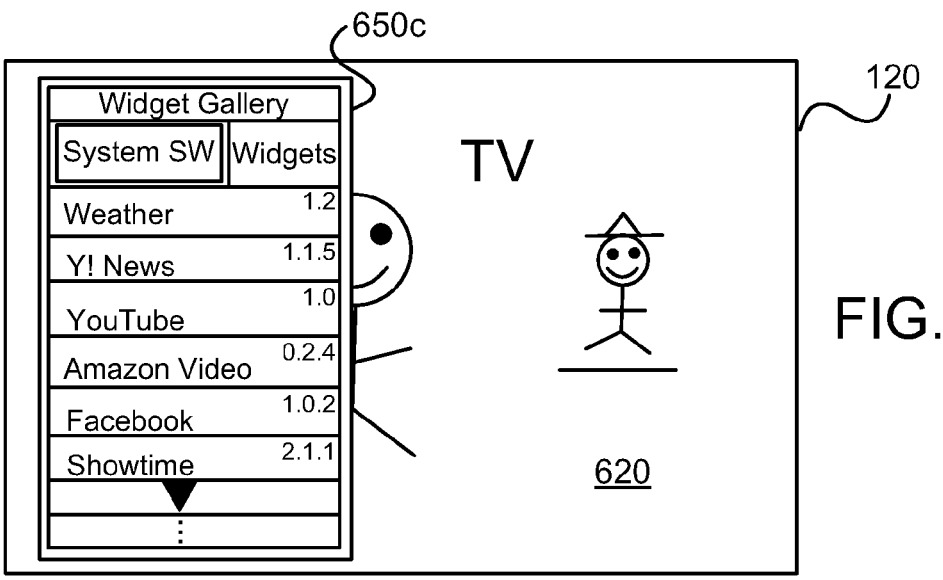

FIG. 14 illustrates an example where a user has accessed the widget dock 610 of FIG. 10, and accessed widget gallery 602*a*. When accessing widget gallery 602*a*, display region 650*b* is presented on display device 120 over the TV region 620. The widget gallery is shown in FIG. 14 as a graphical user interface that is selectable by the user to present information about the system software, or the widgets installed on the device. In FIG. 14, the system software will identify different attributes of the widget gallery installed on the display device 120. In FIG. 15, the region 650c will illustrate the various widgets that are installed on the display device 120 and accessible to the user. In this example, additional information, such as versioning is provided to allow the user to see which version of a specific widget is installed on their device.

From time to time, a process can occur in the background to update the various widgets automatically. The different widgets, when installed by the server onto the display device can either notify the user of the display device, or simply perform the task in the background without the user's knowledge. Of course, the widgets that are updated and installed on the device are those widgets that are selected by the user of the display device to be installed on the device. Accordingly, only those widgets that the user of the display device allows to be part of the widget gallery would be updated or maintained by the server.

Figure 16:
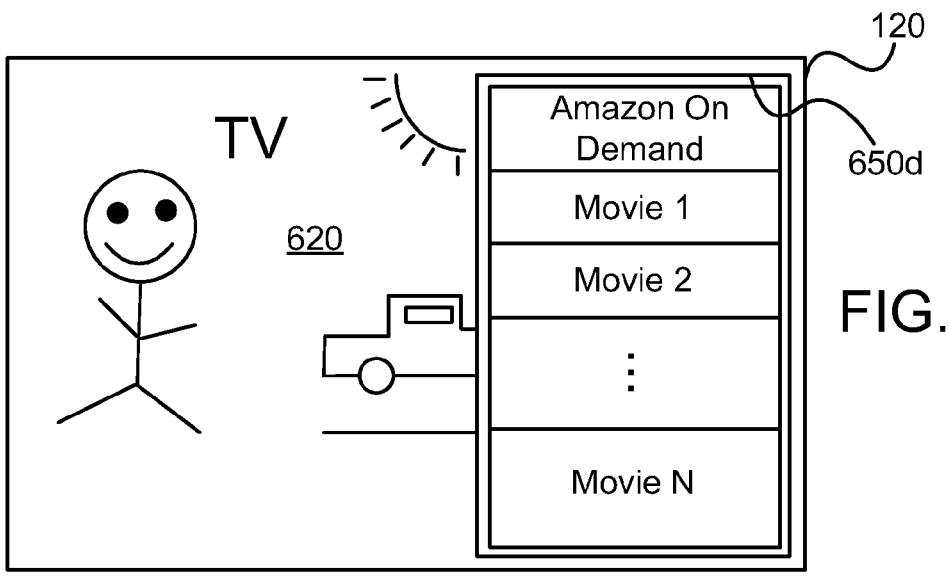

In FIG. 16, an example of a user selecting a movie site 650d is provided. The user interface will provide the user with selection menus for identifying specific movies to play on the display device 120, based on their selections. This example is provided to show the dynamic and friendly user interface that provides quick access to applications that can be rendered and made useful on the display device 120 without complex user interactivity or settings.

Figure 17:
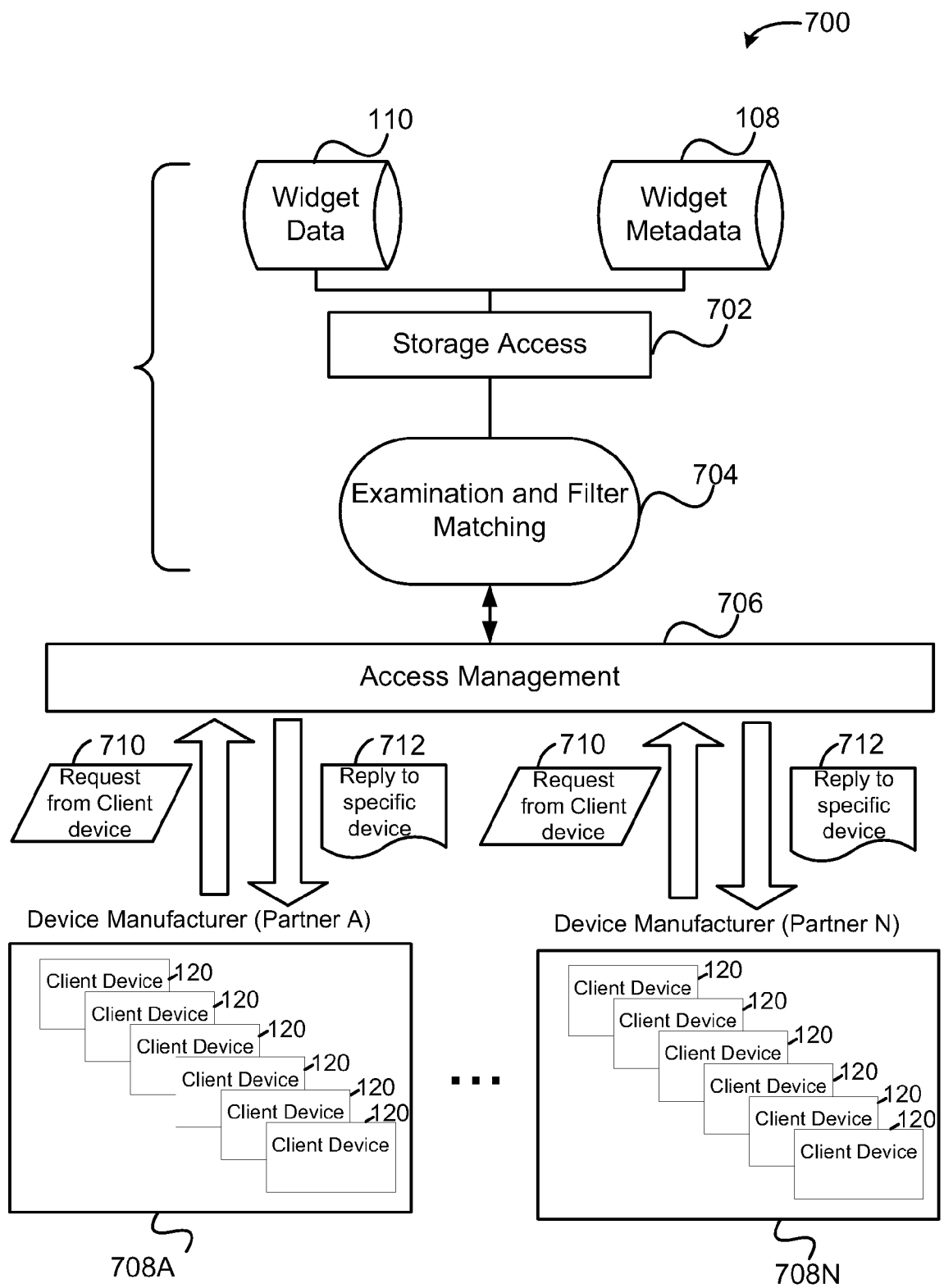
FIG. 17 illustrates one embodiment of a re-matching process for matching display devices to widgets and widget libraries, in accordance with one embodiment of the present invention.

FIG. 17 illustrates a system diagram 700 of the inter-operation between the gallery back end systems and the various device manufacturer partners, in accordance with one embodiment of the present invention. In this embodiment, the gallery back end systems will include the examination and filter matching logic 704 that communicates with storage access 702, and the widget data 110 and widget metadata 108. The examination and filter matching logic 704 is configured to receive requests from the various client devices 120 of the device manufacturer partners, and provide access to specific widgets, widget data, or metadata, depending on the specific manufacturer and the specific devices, as well as other filtering criteria. In this example, a device manufacturer (partner A) 708A, may include a plurality of client devices 120 installed throughout the globe in the locations of the purchaser of the client devices.

For example, these client devices are television sets or display devices that are installed in homes, businesses, public places, etc. In one example, the device manufacturer may be Samsung, and Samsung may have a plurality of client devices 120, each with capability to access the widget gallery infrastructure. The different client devices 120 may include different models, different capabilities on the devices, different software, different hardware, and the like. The widget gallery infrastructure will also include a variety of different types of instances of various widgets that may be available to that device manufacturer and the specific devices of that device manufacturer.

Accordingly, requests (e.g., web services requests) from a client device 710 are processed through an access management layer 706 that is designed to securely authenticate access from a specific device 120 coming from a particular manufacturer. The request from the client 710, once authenticated in the access management layer 706, is passed to the examination filter and matching module 704. Examination and filter matching is performed on specific data pieces provided in the request by the client device. Those specific data pieces can be embodied in the form of filters, code values, keys, encryption keys, licenses, and other identified information.

It is the function of the examination and filter matching module 704 to then match which specific widgets are available for the requesting client device, or accessible to the requesting client device. Thus, once the examination and filter matching module 704 makes its determination as to what filters are provided within the request, the widget metadata 108 is also examined to find matching parameters that define specific widgets, widget information or data types that will be presented to the client device. The determination of which widget to present or provide access to the specific request and device will depend on the specific filters integrated either within the widgets themselves (as defined in the metadata), or as additional filters provided by the widget developer, partner, or the widget gallery infrastructure management.

Once the examination and filter matching is performed in module 704, the reply to the specific device 712 is passed back to the specific client device. This operation occurs throughout the globe for each of the client devices requiring access to the widget gallery infrastructure. Accordingly, the examination and filter matching 704 provides a seamless interface between the widget data and the specific client devices, which removes the need for user interaction in programming, filtering, loading, or managing software on the client device. Thus, the connections between the widget gallery infrastructure servers and the client devices can handle the authentication, management, and access to specific widgets in the widget gallery so that each client device will have access to a very concise view of a single widget database available for that specific device.

Example Parameters: Part III

In one embodiment, some common parameters are used in certain of the Gallery Services. These include:

format
    The YOS format parameter controls the output format of the results. The value should be xml (the default) or json. The optional values application/xml and application/json are also supported.

devel
    The devel parameter indicates that the TV is in Developer Mode and will accept widgets that are in development. If Developer Mode is enabled, the value of the parameter should be 1. If Developer Mode is disabled, the parameter should not be sent in the request.

The following values are typically extracted from the TV API System object and Widget Engine settings. They are used to match widgets to the capabilities of the client platform. These API Parameters names can be used as fields in filters to control the distribution of widgets. The device-info field can be used by the partner to send a list of partner-specific parameters to the gallery that can then be used as fileds in filter expressions.

EXAMPLE AND NON-EXHAUSTIVE LIST

| API Parameter | TVAPI call | Description |
| --- | --- | --- |
| man | getOEM( ) | The manufacturer of the device. (Samsung, Sony Matsushita) |

-continued

| API Parameter | TVAPI call | Description |
| --- | --- | --- |
| brand | getDeviceBrand( ) | The manufacturer's consumer brand of the device. (Pavv, Sony, Panasonic) |
| class | getDeviceClass( ) | The manufacture's class of the device. (70, XBR4) |
| model | getDeviceModel( ) | The manufacturer's model identifier of the device. (LNT-5281F, KDL-52XBR4) |
| deviceid | getDeviceId( ) | A unique identifier of an individual device. |
| hwversion | getDeviceVersion( ) | An identification of the manufacture's hardware platform in the device. (chelsea-1.2, x255-12.12.08) |
| swversion | getDeviceSoftwareVersion( ) | An identification of the manufacture's core software running on the device. (coreos-1.3) |
| region | getCountry( ) | An ISO 3166-1 alph-2 identifier of the current physical location of the device. (US, DE) |
| location | getLocationCode( ) | An region-specific identifier of the current physical location of the device. This could be a postal code. |
| lang | getMenuLanguage( ) | An IETF BCP 47 language tag of the current language in use by the device. |
| deviceinfo | getDeviceInfo( ) | A string of additional key/value pairs defined by the client platform. |
| yweversion | YWE call | An identification of the Yahoo! Widget Engine running on the device. |
| yweres | YWE Call | The current graphics resolution setting of the Yahoo! Widget Engine. (1080, 720, 540) |

In one embodiment, two parameters must be included API calls that require URL authentication parameters.

ts
   A UNIX Epoch time stamp, the number of seconds since midnight Jan. 1, 1970 GMT.

sig
   An 32-byte hex string representation of MD5 hash calculated over the existing URL concatenate with a secret key value of the gallery. The sig parameter must be the last parameter value concatenated to the end of the query string or authentication will fail.

Below is a pseudo-code example of adding these parameters:

var url = 'http://tvgallery.yahoo.com/tvgallery/ap~/vl/gallery/OEMl/widgets?man=OEMl&brand=abrand var t= time( );

Common Parameters
var url+='&ts='+t;
var secret='secretvalue';
var hash=md5 (url+secret);
var url+='&sig='+hash;
Widget Update Service
Gets update information for a specific list of TV Widgets.
Request

| URI | GET |
| --- | --- |
| .../updates | List of update status for each widget requested |

Parameters
A comma-separated list of WidgetID-Version for each widget to check. (com.yahoo.dhs.rj.test1-1 .O.O)

Response
The response will contain an update element for each widget check requested. Possible actions are:

current
   The widget is current an no action is required. This does not mean that this is the most recent version of this widget that is available in the gallery for this device. Newer versions may be available, but no update is recommended.

update
   The widget is outdated and should be updated to a new version. Information on the new version is returned in the result.

upgrade
   The widget is obsolete and requires upgrade to a newer version. Information on the new version is returned in the result. Upgrade should be performed at this time or the widget deleted.

install
   The widget indicated should be installed. Information on the widget is returned in the result.

delete
   The widget is recommended to be deleted from the client. The widget may be unknown to the gallery, in which case only minimal information will be present in the result. Failure to delete the widget may adversely effect operation.

kill
   The widget must immediately be deleted from the client.

Extendible Widget Implementations: Part IV

In one embodiment, the widgets can be presented along with advertising data, that enables targeted advertising to specific users and users in specific demographics. Depending on the user interactivity with the various loaded widgets, user actions, user trends, purchases or navigations can be used to generate a profile of the user or users of the display device. The user can be suggested new widgets to meet the user's business requirements, meet a desire deduced from the user's interactivity or suggest widgets that will improve the user's efficiency. Some widgets will enable the user to perform e-commerce transactions, and those transactions can be tracked with the permission of the user.

The tracking will enable the system to provide more relevant suggestions of possible widgets by third parties, or recommend services or products that can be purchased by the user. Still further, by knowing what the user likes and dislikes, when navigating through display device widgets, the system can provide better advertising for partners, which can be targeted and meaningful. In still another embodiment, synchronization can be provided to match or suggest television channels to the user, that match or relate to the user's widget use. This can also be integrated with social networking programs, or to enable communication (e.g., mail, chat, texting, voice and video).

In still another embodiment, because television system usually have a high bandwidth connection, it is possible to integrate fast and robust video chat widget, that transforms the television system into a video conferencing system. Along these lines, a widget can be provided to enable a group of television sets to be linked to a video conference, without complex conferencing systems.

In other embodiments, widgets can be defined to interface with broadcast content. For instance, when broadcast content is changing or displaying certain information, channel or entertainment topic, the widget can provide internet content regarding the content displayed in the TV. In one example, when a viewer is watching a baseball game, a widget can load to follow statistics for the baseball game in a widget side window or icon. In a cooking show, a widget can provide recipes that relate to the dish being prepared on the broadcast. The interfacing between particular widgets and the broadcast data can therefore provide immersive information regarding what is viewed, and the user can print information from the widget by interfacing the TV to a printer, for example.

In still another embodiment, the processing and software side of the client display device can be integrated into a box or side appliance. This may be useful in case where the user does not wish to purchase a new TV, but wants to enjoy the same widget functionality provided by TVs having the widget hardware and software. In this example, the box can first sync with the TV, so the box can act as if it were the TV, exposing the TV details (e.g., manufacturer, model, etc.).

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

In one embodiment, a system for rendering internet applications on a television system is provided. The system can include a television system with an integrated processor and memory for rendering the internet applications as well as broadcast data. In other embodiments, a module box containing the widget processing applications can be interfaced between the broadcast data provider (cable, satellite, etc.), the internet service provider (i.e., ISP), and the display screen. In one embodiment, the system can include a client program configured for execution on the processor and memory of the television system. A server system configured to store and provide applications is coupled to the client over the internet. Each application is configured with filters, and the filters are used upon exchanges between the client program and the server system. The filters act to include or exclude applications available to the client program based on identification data associated with the television system. The filtering is processed between the client program and the server automatically without user interaction to enable rendering of applications with passing filters on the television system. The applications with passing filters can be illustrated as active on an application dock, and capable of being rendered on a screen area of the television system.

In one embodiment, the server system is provided with load balancing systems and are connected to cloud storage. The cloud storage enables access to the client program of the television system and additional client programs executing on additional television systems simultaneously. In one example, filtering is continuously executed by the server system for each client program requesting access to the server system to access applications. The applications can be created and maintained by multiple third parties, and each third party defines specific filters for their applications.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
 receiving a request, at a server, to register a display device, the display device having integrated hardware for processing applications and for communication over the Internet with the server, the display device further including a connection for communication with a broadcast television provider that provides broadcast content to the display device;
 registering the display device with the server, the registering includes receiving attributes of the display device and validating an access permission of at least one of the select applications using the received attributes of the display device;

receiving, at the server from the display device, information for identifying the broadcast content that is currently being rendered on the display device;

using the information received from the display device to determine application data for the at least one of the applications to process by the integrated hardware of the display device; and sending to the display device the application data for the at least one of the applications to process by the integrated hardware of the display device, the application data being correlated to the broadcast content currently being rendered on the display device.

2. The method of claim 1, wherein the application data is rendered along with the broadcast content rendered on the display device, and the application data changes in response to changes occurring in the broadcast content rendered on the display device.

3. The method of claim 1, wherein the application data is rendered along with the broadcast content rendered on the display device, and the application data changes in response to different broadcast content being rendered on the display device.

4. The method of claim 1, wherein each of the applications include a container that provides user interfaces for navigating data enabled by respective applications.

5. The method of claim 1, wherein each application provides functionality for rendering an extended window over part or all of a screen of the display device, the extended window providing a graphical user interface for accessing or viewing data enabled by the application, wherein the extended window is defined by text or text and graphics that are transparent or non-transparent.

6. The method of claim 1, wherein an application provides presentation of one or more of relevant advertising content, or social media content, and/or comment exchanges between multiple connected parties.

7. The method of claim 1, wherein the application data provides facts or information related to the broadcast content rendered on the display device, the facts or information are supplemental information that is obtained by the server and provided back to the display device, wherein the facts or information change over time as the broadcast content rendered on the display device changes.

8. A system, comprising:
a server, including,
storage and a processor,
the processor is configured to execute receiving of a request to register a display device, the display device having integrated hardware for processing applications and for communication over the Internet with the server, the display device further including a connection for communication with a broadcast television provider that provides broadcast content to the display device,
the processor is configured to execute registering of the display device and identifying the attributes of the display device, and validating an access permission of at least one of the select applications using the identified attributes of the display device, the server is configured to receive information from the display device for identifying the broadcast content that is currently being rendered on the display device, use the information received from the display device to determine application data for the at least one of the applications to process by the integrated hardware of the display device, and send to the display device the application data for the at least one of the applications to process by the integrated hardware of the display device, wherein the application data is correlated to the broadcast content currently being rendered on the display device.

9. The system of claim 8, wherein the application data provides facts or information related to the broadcast content rendered on the display device, the facts or information are supplemental information that is obtained by the server and provided back to the display device, wherein the facts or information change over time as the broadcast content rendered on the display device changes.

10. The system of claim 8, wherein each application provides functionality for rendering an extended window over part or all of a screen of the display device, the extended window providing a graphical user interface for accessing or viewing data enabled by the application, wherein the extended window is defined by text or text and graphics that are transparent or non-transparent.

11. The system of claim 8, wherein an application provides presentation of one or more of relevant advertising content, or social media content, and/or comment exchanges between multiple connected parties.

12. The system of claim 8, wherein the application data is rendered along with broadcast content rendered on the display device, and the application data changes in response to changes occurring in the broadcast content rendered on the display device.

13. A non-transitory computer readable media having program instructions embodied thereon, the program instructions comprising:
program instructions for receiving a request, at a server, to register a display device, the display device having integrated hardware in the display device for processing applications and for communication over the Internet with the server, the display device further including a connection for interfacing with a broadcast television provider that provides broadcast content to the display device;
program instructions for registering the display device with the server, the registering includes receiving attributes of the display device and validating an access permission of at least one of the select applications using the received attributes of the display device;
program instructions for receiving, at the server from the display device, information for identifying the broadcast content that is currently being rendered on the display device;
program instructions for using the information received from the display device to determine application data for the at least one of the applications to process by the integrated hardware of the display device; and
program instructions for sending to the display device the application data for the at least one of the applications to process by the integrated hardware of the display device, the application data being correlated to the broadcast content currently being rendered on the display device.

14. The computer readable media of claim 13, wherein the application data is rendered along with the broadcast content rendered on the display device, and the application data changes in response to changes occurring in the broadcast content rendered on the display device.

15. The computer readable media of claim 13, wherein the application data is rendered along with the broadcast content rendered on the display device, and the application data changes in response to different broadcast content being rendered on the display device.

16. The computer readable media of claim 13, wherein each of the applications include a container that provides user interfaces for navigating data enabled by respective applications.

17. The computer readable media of claim 13, wherein each application provides functionality for rendering an extended window over part or all of a screen of the display device, the extended window providing a graphical user interface for accessing or viewing data enabled by the application, wherein the extended window is defined by text or text and graphics that are transparent or non-transparent.

18. The computer readable media of claim 13, wherein an application provides presentation of one or more of relevant advertising content, or social media content, and/or comment exchanges between multiple connected parties.

* * * * *